(12) United States Patent
Li et al.

(10) Patent No.: US 11,752,584 B2
(45) Date of Patent: Sep. 12, 2023

(54) FULL-AUTOMATIC WHEEL HUB FEEDING-BLANKING SYSTEM FOR INTELLIGENT PRODUCTION LINE OF AUTOMOTIVE WHEEL HUBS

(71) Applicants: QINGDAO UNIVERSITY OF TECHNOLOGY, Shandong (CN); IK GUJRAL PUNJAB TECHNICAL UNIVERSITY, Jalandhar (IN)

(72) Inventors: Changhe Li, Qingdao (CN); Dewei Liu, Qingdao (CN); Zongming Zhou, Qingdao (CN); Naiqing Zhang, Qingdao (CN); Bo Liu, Qingdao (CN); Shubham Sharma, Jalandhar (IN); Wenfeng Ding, Qingdao (CN); Zechen Zhang, Qingdao (CN)

(73) Assignees: QINGDAO UNIVERSITY OF TECHNOLOGY, Qingdao (CN); IK GUJRAL PUNJAB TECHNICAL UNIVERSITY, Jalandhar (IN)

( * ) Notice: Subject to any disclaimer, the term of this patent is extended or adjusted under 35 U.S.C. 154(b) by 0 days.

(21) Appl. No.: 17/829,421

(22) Filed: Jun. 1, 2022

(65) Prior Publication Data
US 2023/0031445 A1  Feb. 2, 2023

(30) Foreign Application Priority Data
Jul. 29, 2021 (CN) .......................... 202110864861.4

(51) Int. Cl.
*B25J 15/06* (2006.01)
*B23Q 7/04* (2006.01)

(52) U.S. Cl.
CPC ............. *B23Q 7/046* (2013.01); *B23Q 7/043* (2013.01); *B25J 15/0658* (2013.01); *B23Q 2707/003* (2013.01); *B23Q 2707/04* (2013.01)

(58) Field of Classification Search
CPC .. B23Q 7/046; B23Q 7/043; B23Q 2707/003; B23Q 2707/04; B25J 15/0658
See application file for complete search history.

(56) References Cited

U.S. PATENT DOCUMENTS

| 5,125,298 A * | 6/1992 | Smith ................... B23P 19/069 |
| | | 81/57.35 |
| 6,219,918 B1 * | 4/2001 | Wieland ................. B23P 23/00 |
| | | 82/122 |

FOREIGN PATENT DOCUMENTS

| CN | 208773576 U | 4/2019 |
| CN | 211569369 U | 9/2020 |
| CN | 112079034 A | 12/2020 |

* cited by examiner

*Primary Examiner* — Nirvana Deonauth
(74) *Attorney, Agent, or Firm* — Oliff PLC

(57) ABSTRACT

Provided a full-automatic wheel hub feeding-blanking system for intelligent production line of automotive wheel hubs, comprising: an intelligent material rack and a robot; the intelligent material rack comprises a bracket assembly, a turntable assembly and a bearing seat assembly; the turntable assembly being rotatable is mounted on the bearing seat assembly; the bracket assembly mounted on the turntable assembly comprises a base provided with at least one group of lifting devices, and each the group comprises three the lifting devices, and each of which an automotive wheel hub supporting plate assembly is provided on, central axis of the three automotive wheel hub supporting plate assemblies forming the angle of 120 degrees; the robot being mounted on one side of the intelligent material rack and comprises a robotic arm, and a manipulator is mounted on the robotic arm, and the manipulator is used for clamping the automotive wheel hub.

10 Claims, 20 Drawing Sheets

FULL-AUTOMATIC WHEEL HUB FEEDING-BLANKING SYSTEM FOR INTELLIGENT PRODUCTION LINE OF AUTOMOTIVE WHEEL HUBS

CROSS-REFERENCES TO RELATED APPLICATIONS

This application claims priority benefits to Chinese Patent Application No. 202110864861.4, filed 29 Jul. 2021, the contents of which are incorporated herein by reference.

TECHNICAL FIELD

The present invention relates to the technical field of mechanical processing equipment, and specifically to a full-automatic wheel hub feeding-blanking system for intelligent production line of automotive wheel hubs.

BACKGROUND

With the continuous development of the transportation industry, the demand for automobiles is increasing in today's society, which puts forward new requirements for the processing quality and processing efficiency of automobile parts. Wherein, automotive wheel hub is an essential part of the automobile, and the quality of automotive wheel hub is related to the safety of the automobile in the process of high-speed driving, and molding process thereof is various. The traditional wheel hub processing method can no longer meet the development needs of today's society. With the development of domestic society, people's demand for intelligence is becoming higher and higher. In this case, in the wheel hub machining workshop, workers still have to carry out repetitive handling work during feeding and blanking, which makes workers less sensitive and less efficient in long term work. Therefore, it is an inevitable trend to introduce intelligent feeding-blanking system to replace manual operation in response to intelligent demand, improve manual labor conditions, stabilize product quality and increase production efficiency.

Chinese patent application CN202010898589.7 disclosed an automotive wheel hub material rack, but the material rack cannot locate the position of each wheel hub on the rack, and when using the spreader to feed the wheel hub, the movement trajectory of the spreader cannot be determined, which affects the efficiency of picking up the parts and thus the processing efficiency of the wheel hub. In addition, the actions of pulling the layer frame and flipping the layer frame requires manual assistance to complete.

Chinese patent application CN201821585753.3 disclosed a multi-directional grasping type manipulator for feeding and blanking of automotive wheel hub. However, the manipulator uses grasping wheels for clamping and is not equipped with a buffer mechanism, which is very likely to produce surface damage to the wheel hub after finishing. Moreover, the grasping position of the manipulator is at the position of wheel rim of the wheel hub, and when processing different sides of the wheel hub, the wheel hub cannot be turned over, and other devices are needed to realize the grasping of edge changing of the wheel hub, which affects the processing efficiency of the wheel hub.

Chinese patent application CN201922336112.5 provided a flexible adaptive manipulator for handling wheel hubs, but the manipulator is difficult to ensure that the action stroke formations of two air cylinders at left and right sides are exactly the same in the process of use, which will lead to position errors in the process of feeding and blanking of the wheel hub. In addition, the manipulator uses the spring force as the clamping force, which is very likely to lead to the failure of the spring and requires frequent shutdown of the manipulator for maintenance.

In summary, there is no complete feeding-blanking system of automotive wheel hub in the prior art, and the design of the manipulators for feeding and blanking cannot meet the clamping of various sizes of wheel hubs, and there is extremely easy to scratch the wheel hub after finishing during clamping, which affects the surface roughness of the wheel hub; in addition, most of the manipulators in the prior art use V-shaped wheels to clamp the wheel rim part of the wheel hub, so that overturning devices are needed to assist with the edge changing clamping when changing the edge of the wheel hub to process, which cannot realize the self-overturning of the wheel hub; the material rack for the wheel hub in the prior art only provides the function of storing the wheel hub, and cannot carry out positioning for the position of the wheel hub on the material rack, which makes it difficult for the manipulator to accurately pick-up and put-in the parts from the material rack during feeding and blanking.

SUMMARY

In view of the shortcomings of the prior arts, the present invention provides a full-automatic wheel hub feeding-blanking system for intelligent production line of wheel hubs, wherein, comprising a robot and an intelligent material rack, and the robot and the intelligent material rack are matched with each other so as to realize the accurate feeding and blanking of the wheel hubs; the robot provides functions of clamping, taking and handling, and the intelligent material rack provides functions of positioning, storing and taking, and therefore, workers are liberated from the work of the feeding and blanking of the wheel hub, the labor intensity of the workers is reduced, and the production efficiency of the production line is improved, and meanwhile, the production workshop can be dean and intelligent.

In order to achieve the above purpose, the present invention is realized by the following technical solutions.

A full-automatic wheel hub feeding-blanking system for intelligent production line of automotive wheel hubs, comprising: an intelligent material rack and a robot;

the intelligent material rack comprises a bracket assembly, a turntable assembly and a bearing seat assembly; the turntable assembly is mounted on the bearing seat assembly, and the turntable assembly is rotatable; the bracket assembly is mounted on the turntable assembly and comprises a base, and at least one group of lifting devices are provided on the base, and each of the group comprises three of the lifting devices, and an automotive wheel hub supporting plate assembly is provided on each of the lifting device, and the central axis of the automotive wheel hub supporting plate assembly of the three lifting devices forming an angle of 120 degrees;

the robot is mounted on one side of the intelligent material rack and comprises a robotic arm, and a manipulator is mounted on the robotic arm, and the manipulator is used for clamping the automotive wheel hub.

As further embodiments, the automotive wheel hub supporting plate assembly comprises supporting plates, air cylinders, sliding sleeves, and V-shaped blocks; the air cylinder is fixed on the supporting plate and is connected with a first end of a first connecting rod which is vertically arranged, and a second end of the first connecting rod is connected with a second connecting rod which is horizontally arranged, and the second connecting rod is connected to the V-shaped block through the sliding sleeve which is fixed on the supporting plate.

The wheel hub is placed on a bottom plane composed of three the supporting plates, which can limit a rotation of the wheel hub in X-axis and Y-axis direction and a movement in Z-axis direction. An included angle between each two the V-shaped blocks is 120 degrees in the three V-shaped blocks, which plays roles of both positioning and clamping, and can limit the movement of the wheel hub in the X-axis and Y-axis directions when playing the role of positioning. At this time, only the Z-axis direction of the wheel hub is not positioned, is an incomplete positioning method. At the same time, the three V-shaped blocks clamp the wheel hub. The V-shaped blocks are driven by air cylinders and have a certain stroke range, so that the self positioning and clamping of wheel hubs of different sizes can be realized.

As further embodiments, the lifting device is a sprocket chain lifting mechanism, and a plurality of the bearing seat assemblies are provided sequentially on the sprocket chain lifting mechanism.

As further embodiments, the manipulator comprises a connecting seat, and a clamping device is respectively arranged at two ends of the connecting seat, the clamping device has the same structure, and each of the clamping device comprises a mounting seat, two clamping plates are symmetrically arranged on the mounting seat, and the two clamping plates are controlled by a driving device; two suction cup assemblies are arranged on each clamping plate; the angle between the two suction cup assemblies is changed by driving the air cylinder.

Further, the suction cup assembly comprises a suction cup, a connector, a ball head, ball tiles and a tightening ring, the ball head is mounted in ball grooves of the two ball tiles, and the two ball tiles are locked by the tightening ring, the connector is connected with the ball head by threads, and the suction cup is bonded with the connector by sealant. The suction cup can be self-adapted to wheel rim curved surfaces of the wheel hubs with different size by the ball head, so that the suction cup can be better fit on the surface of the wheel hub.

As further embodiments, the turntable assembly comprises a spoke weighing sensor, a mounting seat, a turntable and a universal wheel; two circular slots with similar size to the base in the bracket assembly are processed on the turntable for mounting the spoke weighing sensor and the mounting seat; the bracket assembly is connected with the mounting seat and the spoke weighing sensor; the universal wheel is set at a bottom of the turntable and plays a role in maintaining the stability of the turntable. The turntable is mounted on a slewing support on the bearing seat assembly.

As further embodiments, the turntable is in the shape of "∞" (infinite loop), two circular slots are processed on the turntable, and two of the mounting seats and one of the spoke weighing sensors are mounted in one of the circular slots.

As further embodiments, the turntable is driven by a motor on the bearing seat assembly.

Provided a using method of the full-automatic wheel hub feeding-blanking system for intelligent production line of automotive wheel hubs described above, comprising:

during feeding, an automotive wheel hub is positioned on a bearing seat assembly, computer sends a signal of picking-up material to a robot, the robot reaches an appointed position according to a path planned by the computer, the computer sends a signal to the pneumatic circuit of the manipulator according to the size of the wheel hub, the pneumatic circuit of a micro air cylinder is controlled to be opened, and the opening and closing angle of a suction cup assembly is adjusted through the stretching of a piston rod of the micro air cylinder.

The computer sends a signal to the pneumatic circuit of the manipulator to control the pneumatic circuit of the air cylinder to be opened, and the piston rod of the air cylinder retracts so as to control the clamping plates moving to move in a centering way, and a vacuum circuit of the suction cup is opened at the same time.

When the suction cup is contact with a wheel rim surface of the wheel hub, with the help of ball head structure, the suction cup can be completely fitted on surface of the wheel rim by thrust of the clamping plate while the clamping plates continue to move to the center. Because of the opening of the vacuum circuit, a negative pressure is generated in a cavity of the suction cup. When the negative pressure in the suction cup cavity reaches a predetermined value, the wheel hub is completely adsorbed, a vacuum pressure switch sends an electrical signal to the computer, and the clamping is completed.

The piston rod of the air cylinder on the bracket assembly retracts, so that the V-shaped blocks release the wheel hub and the robot carries the wheel hub to a designated position. A spoke weighing sensor at a bottom of the bracket assembly senses a change in gravity and sends a signal to the computer.

The computer determines whether there is the wheel hub on the bracket assembly based on the electrical signal sent from the spoke weighing sensor, and if there is still the wheel hub, the computer controls a helical gear-bevel gear geared motor on the lifting device to start, and the supporting plate assembly on a second layer rises with a chain to a top position to wait for the manipulator to perform the device clamping again. If there is no the wheel hub on the bracket assembly, then the computer controls the helical gear-bevel gear geared motor on the bearing seat assembly to start, the turntable rotates 180 degrees, and the full-load bracket assembly and the empty-load bracket assembly change positions; the full-load bracket assembly continues to perform a task of feeding, and the empty-load bracket assembly waits for a replenishment of the wheel hub blank.

During blanking, the manipulator clamps the wheel hub and puts the wheel hub on an uppermost supporting plate, and the piston rod of the air cylinder on the supporting plate assembly extends out, thus the V-shaped blocks positioning and clamping the wheel hub. The spoke weighing sensor at the bottom of the bracket assembly senses the change of gravity and sends a signal to the computer, and the computer receives and analyzes the signal and then judges whether the bracket assembly is fully filled with the wheel hub.

If the bracket assembly is not fully filled with the wheel hubs, the computer controls the helical gear-bevel gear geared motor on the lifting device to start, and a spindle of the helical gear-bevel gear geared motor rotates in an opposite direction to that of the feeding, and the uppermost supporting plate assembly descends to the second layer position with the chain, and the uppermost position is replenished with empty supporting plate assemblies and waits for the feeding. If the bracket assembly is full of the wheel hubs, the computer controls the helical gear-bevel gear geared motor on the bearing seat assembly to start, the turntable rotates by 180 degrees, the full-load bracket assembly and the empty-load bracket assembly switch positions, the empty-load bracket assembly continues to execute the task of blanking, and the full-load bracket assembly waits for the wheel hub warehousing or the feeding task of the next process.

The beneficial effects of the present invention are as follows:
1. the automotive wheel hub feeding-blanking system of the present application is highly automated and can automatically carry the wheel hubs to a bracket and place them on the bracket in a reasonable and orderly manner; during feeding and blanking, there is no need for workers to carry the wheel hubs repeatedly, and workers only need to monitor a computer to prevent errors or damage to procedures and devices;
2. The automotive wheel hub feeding-blanking system of the present application can realize positioning and clamping of wheel hubs with different size on the intelligent material rack and automatically feeding and blanking. During feeding and blanking, a robot only needs to pick up and put the parts at a fixed position, which improves the accuracy of picking up. Meanwhile, the intelligent material rack can automatically monitor the number of wheel hub on the rack;
3. The automotive wheel hub feeding-blanking system of the present application can realize a clamping and transportation of wheel hubs of different sizes, and apply a clamping method of suction cup adsorption to make the clamping flexible and will not cause scratches to the wheel hub after finishing; a manipulator has a jet pipe for removing the aluminum chips remaining after the wheel hub is processed and prevent the aluminum chips from falling on the ground, which can make the processing workshop cleaner;
4. The automotive wheel hub feeding-blanking system of the present application has the advantages of compact structure and reasonable space utilization;
5. According to the automotive wheel hub feeding-blanking system of the present application, workers can be far away from the processing equipment, and the safety of the operating environment of the workers is improved.

Wherein, bracket assembly I-1, turntable assembly I-2, bearing seat assembly I-3, manipulator II-1 and manipulator arm II-2;
lifting device I-1-1, base I-1-2, wheel hub III;
sprocket chain I-1-1-1, barrier plate I-1-1-2, air source distributor I-1-1-3, supporting plate assembly I-1-1-4, first transmission shaft I-1-1-5, helical gear-bevel gear geared motor I-1-1-6, tensioner I-1-1-7, second transmission shaft I-1-1-9, bracket I-1-1-10, air tube I-1-1-11,
V-shaped block I-1-1-4-1, straight guide sleeve I-1-1-4-2, guide rod I-1-1-4-3, flange I-1-1-4-4, connecting rod I-1-1-4-5, flange I-1-1-4-6, air cylinder I-1-1-4-7, supporting plate I-1-1-4-8;
spoke type load cell I-2-1, mounting seat I-2-2, turntable I-2-3, universal wheel I-2-4;
locking retaining ring I-3-1, external gear type slewing bearing I-3-2, gear I-3-3, sleeve I-3-4, transmission shaft I-3-8, right angle mounting seat I-3-7, beading seat I-3-5, external spherical ball bearing with seat I-3-6, helical gear-bevel gear geared motor I-3-9;
suction cup assembly II-1-1, mounting seat II-1-2, micro air cylinder II-1-3, clamping plate II-1-4, sliding seat II-1-5, air cylinder II-1-6, air tube II-1-7, connecting seat II-1-8, I-beam mounting seat II-1-9, vacuum generator II-1-10, filter II-1-11, linkage mechanism II-1-12, air cylinder mounting seat II-1-13, flange II-1-14, connecting rod II-1-15, vacuum pressure switch II-1-16;
suction cup II-1-1-1, connector II-1-1-2, ball head II-1-1-3, ball tile II-11-4, tightening ring II-1-1-5.

DETAILED DESCRIPTION

Figure 1:
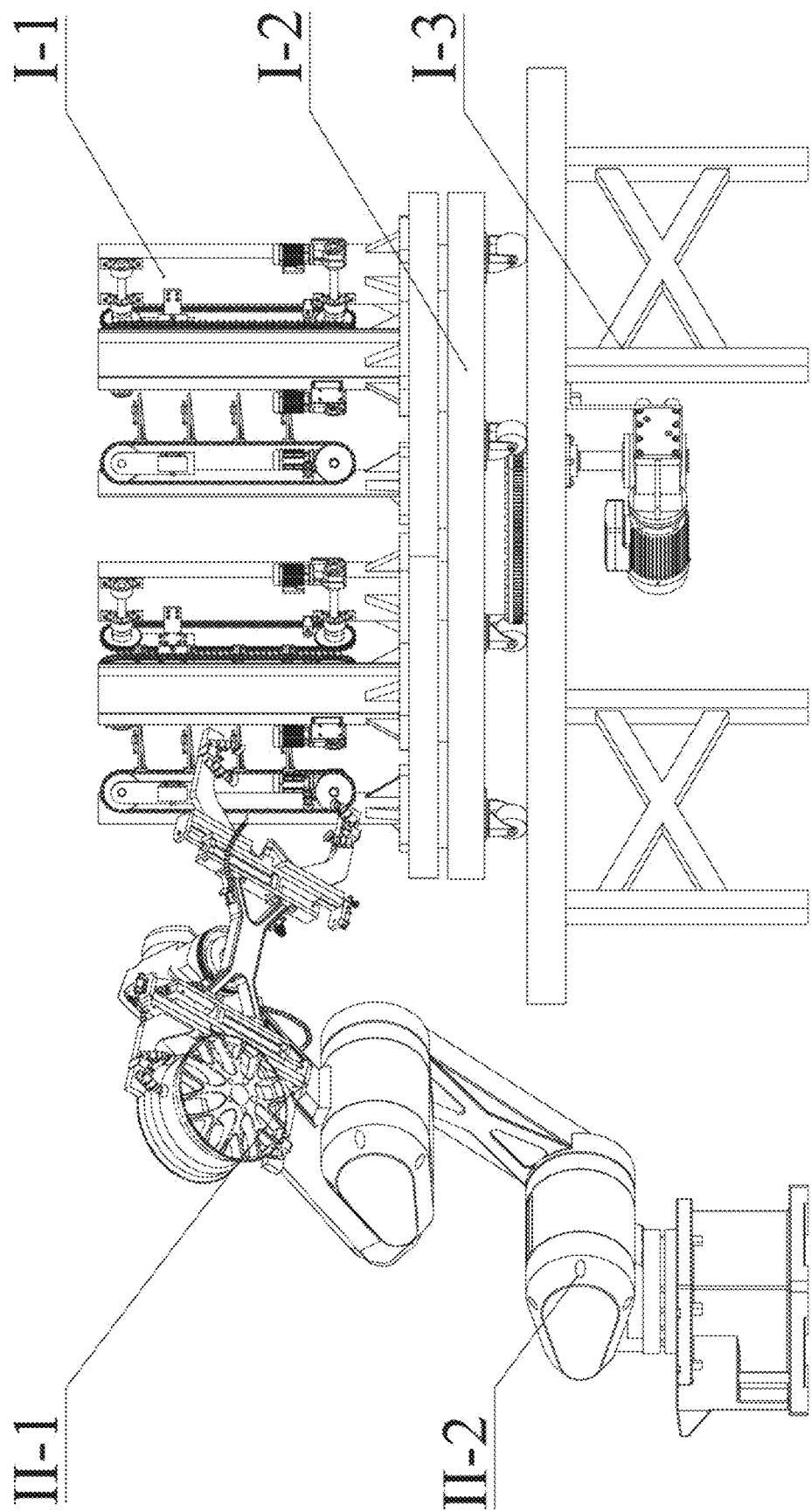
FIG. 1 is an assembly diagram of a wheel hub feeding-blanking system.

An exemplary implementation of the present application, as shown in FIG. 1, accordingly, provided an automotive wheel hub feeding-blanking system comprises an intelligent material rack I and a robot II, wherein the intelligent material rack I comprises a bracket assembly I-1, a turntable assembly I-2, and a bearing seat assembly I-3; the robot II comprises a manipulator II-1 and a robotic arm II-2. Power parts in each mechanism are separately connected to a computer. Wherein, the intelligent material rack I is responsible for transporting wheel hub III to a fixed position and positioning and clamping the wheel hub III to assist the robot II in feeding and blanking. The bracket assembly I-1, as a device for carrying the wheel hub III, is mounted on the turntable assembly I-2, and the bracket assembly I-1 can rotate with the turntable assembly I-2, so as to realize a conversion between the full-load bracket assembly I-1 and the empty-load bracket assembly I-1. The turntable assembly I-2 is mounted on the bearing seat assembly I-3, and the bearing seat assembly I-3 acts as a carrying part of the whole system and also provides power for the rotation of the turntable.

Further, the robot II is responsible for carrying the wheel hub III to a designated position. The manipulator II-1, as a part for clamping the wheel hub III, is mounted on the robotic arm II-2 through a flange. In the present embodiment, the robotic arm II-2 is a robotic arm with six degrees of freedom (6-DOF) II-2, and through the driving of the robotic arm II-2, the manipulator II-1 can realize the wheel hub III grasping action at any position and angle, so as to realize the feeding and blanking of the wheel hub III and the handling of the wheel hub III within a certain position.

Specifically, the bracket assembly I-1 is for carrying the wheel hub III, and realizing the feeding and blanking of the wheel hub III, and providing a reliable positioning for the clamping of wheel hub III by the manipulator II-1.

The turntable assembly I-2, which the bracket assembly I-1 is mounted on, a turntable thereof drives the bracket assembly I-1 to rotate together, which can realize the conversion of the full-load bracket assembly I-1 and the empty-load bracket assembly I-1, so that the feeding and blanking work can be carried out simultaneously.

The bearing seat assembly I-3 is for providing a bearing platform for the turntable assembly and bracket assembly I-1. The bearing seat assembly I-3 is mounted with a geared motor and an external gear type slowing hearing to provide a torque for the rotation of turntable assembly I-2.

The robotic arm II-1 can realize a flexible clamping for the wheel hub III of each size, and can carry the wheel hub III from the bearing seat assembly I-1 to a designated position by cooperating with the robotic arm II-2.

The robotic arm II-2 is the 6-DOF robotic arm II-2, which can enable the robotic arm II-1 to grip the wheel hub III at any position and angle to realize the handling work of the wheel hub III.

Figure 2:
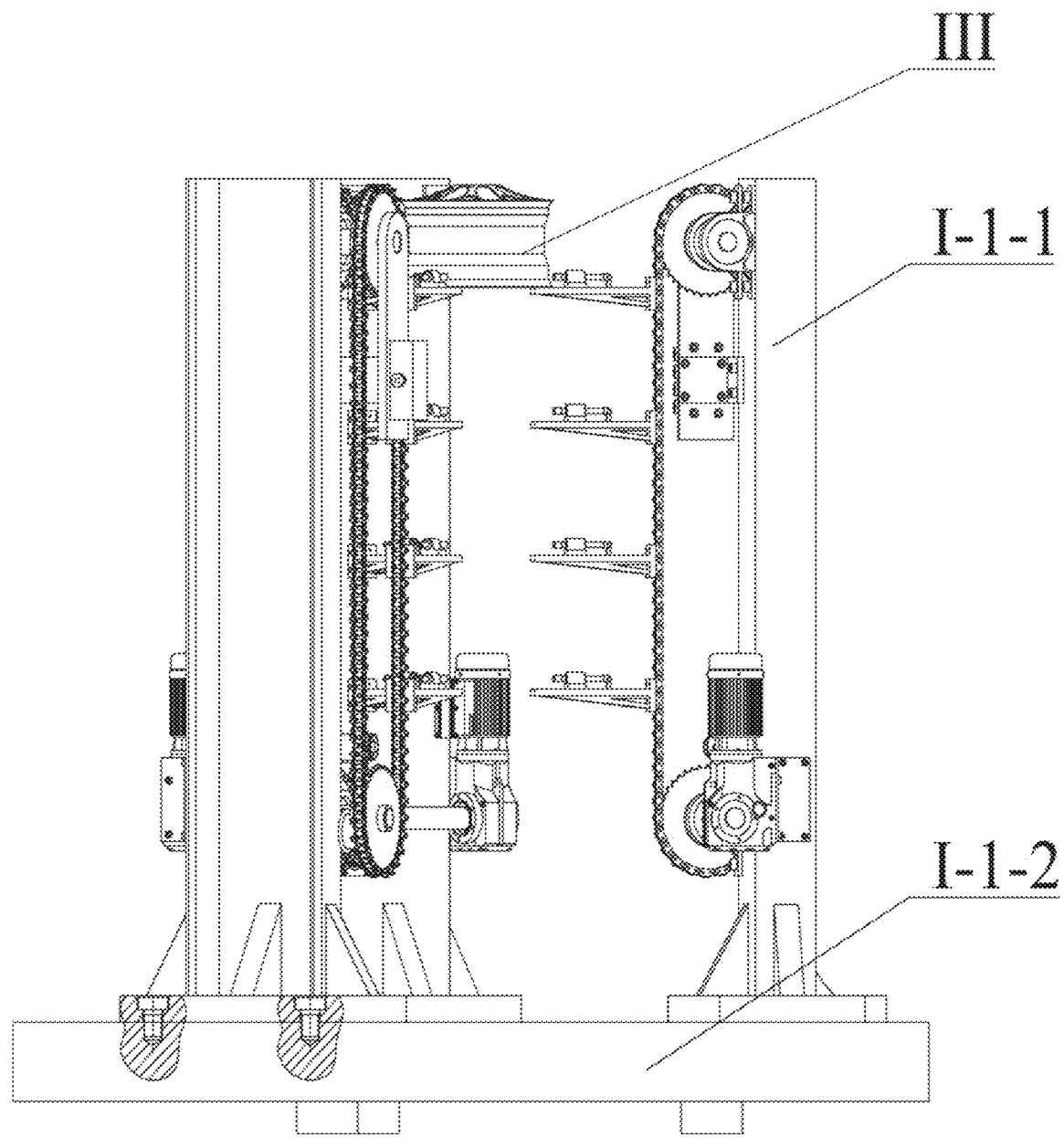
FIG. 2 is a partial sectional view of a bracket assembly.
Figure 3:
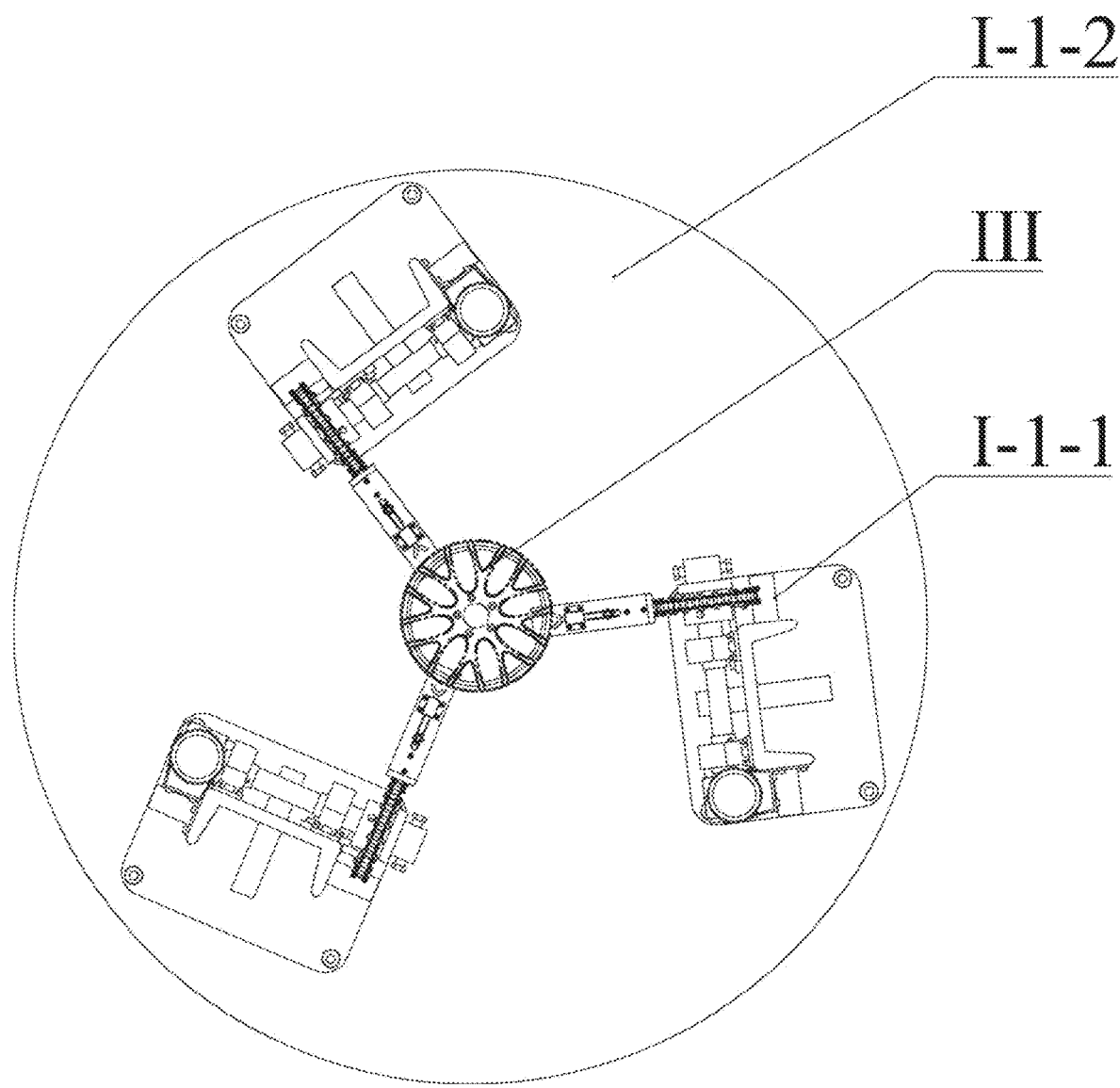
FIG. 3 is an upper view of the bracket assembly.
Figure 4:
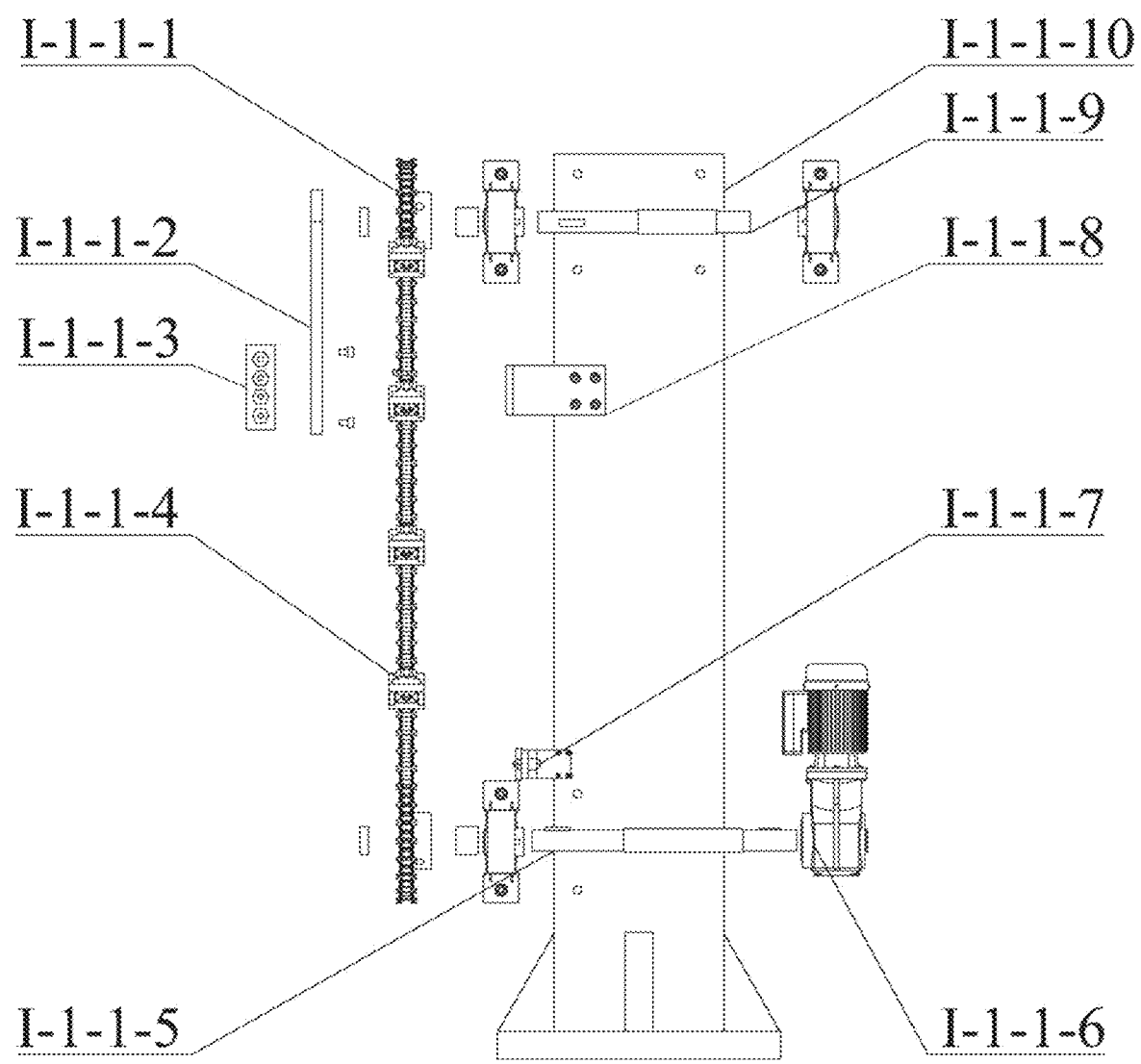
FIG. 4 is an exploded view of a lifting device.
Figure 5:
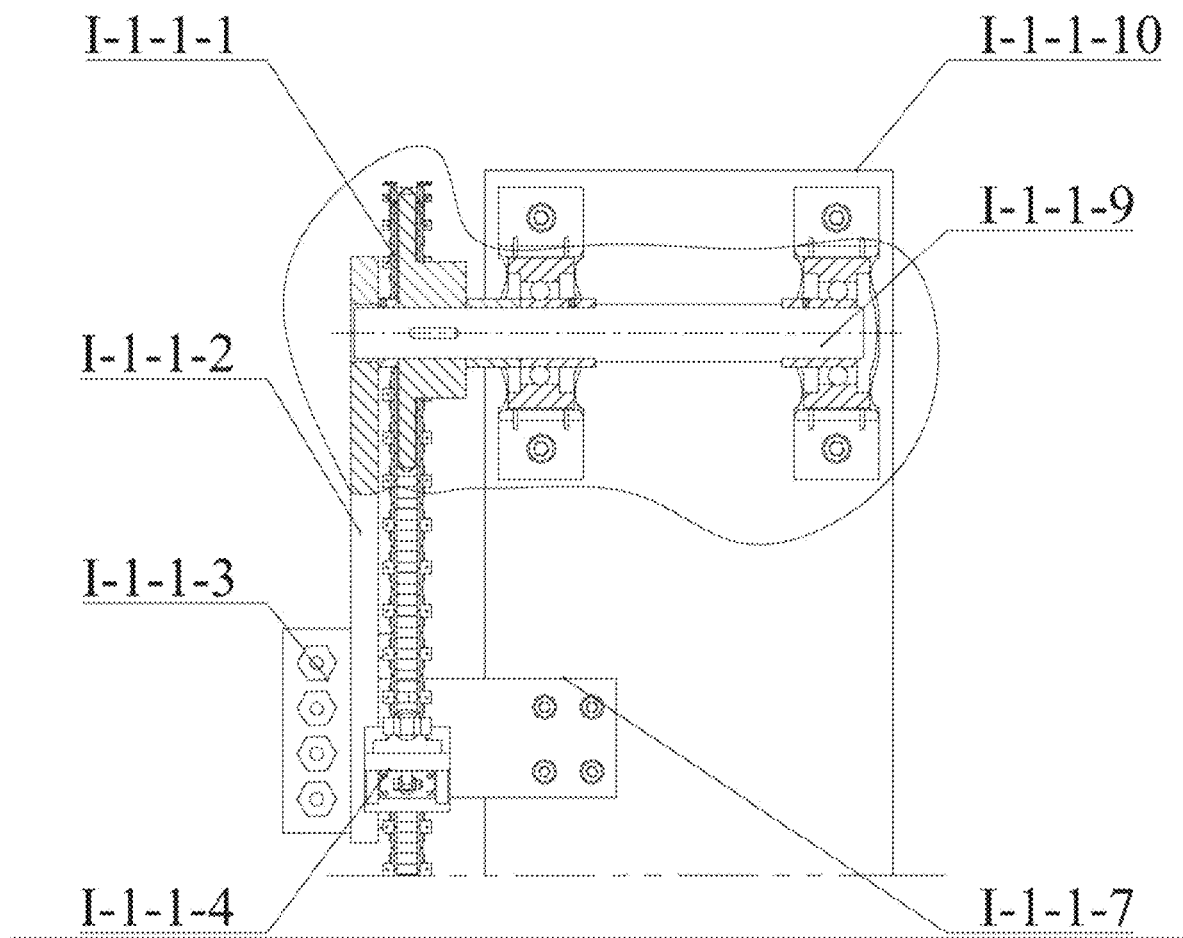
FIG. 5 is a partial sectional view of the lifting device.
Figure 6:
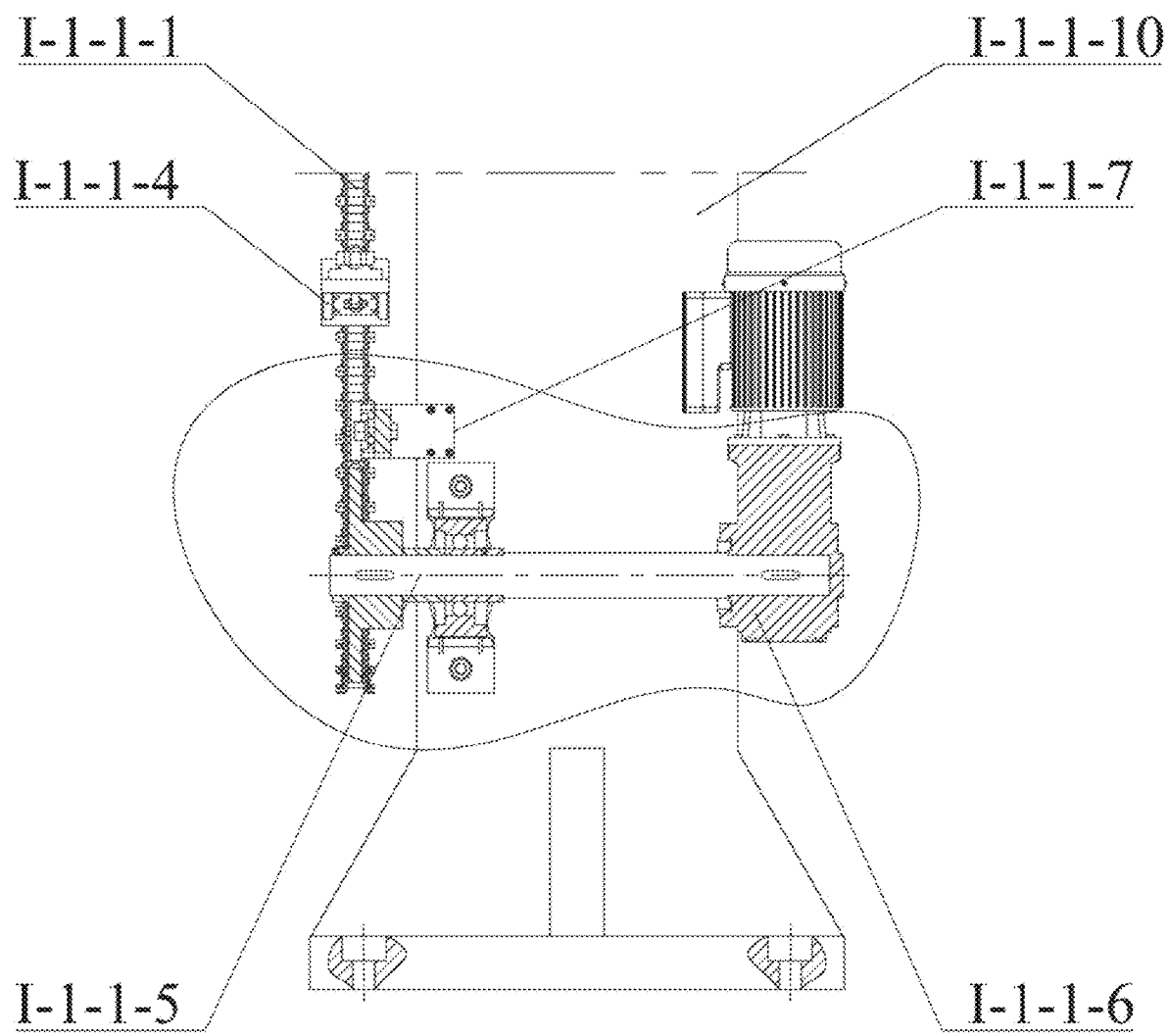
FIG. 6 is another partial sectional view of the lifting device.
Figure 7:
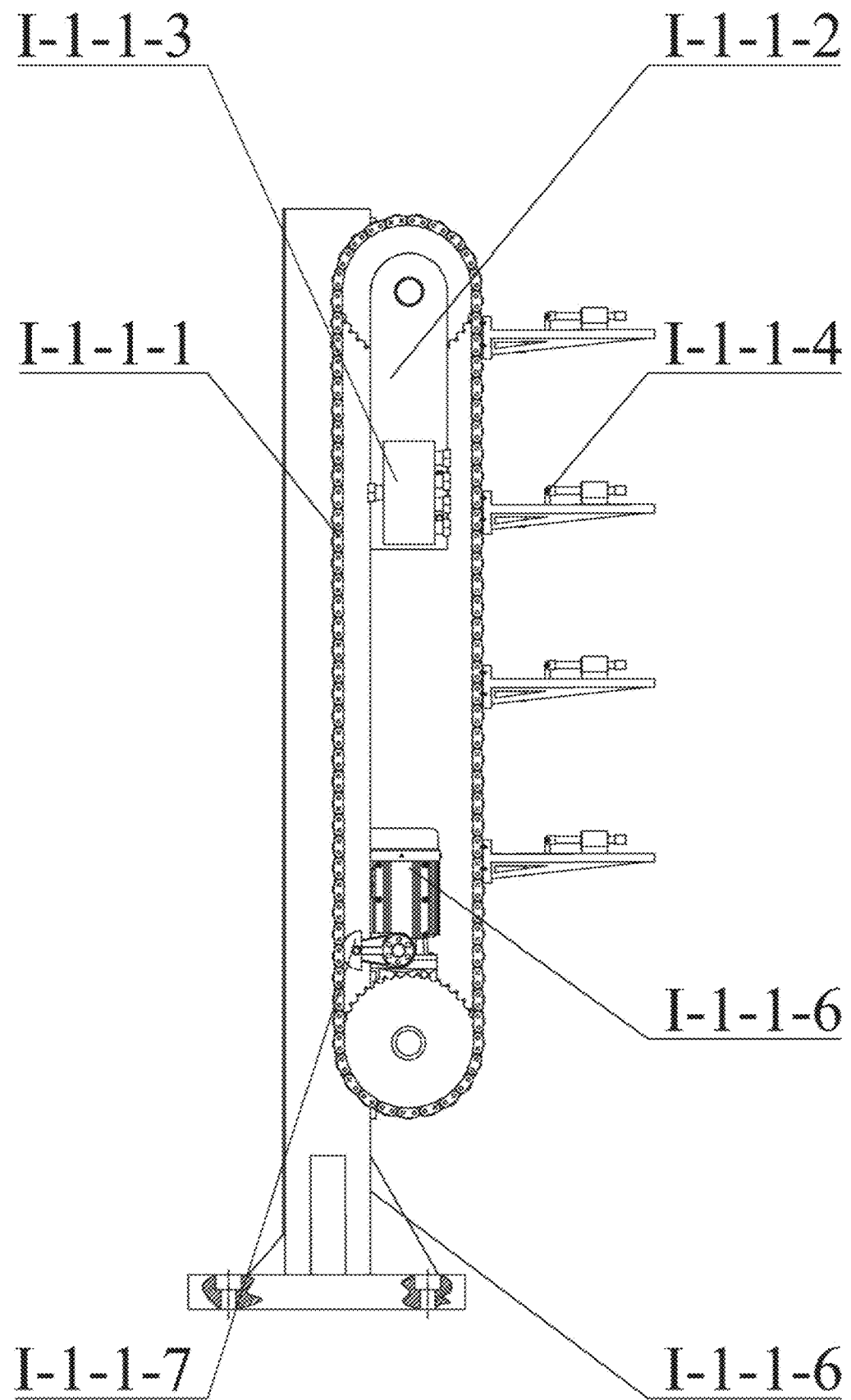
FIG. 7 is another partial sectional view of the lifting device.
Figure 8:
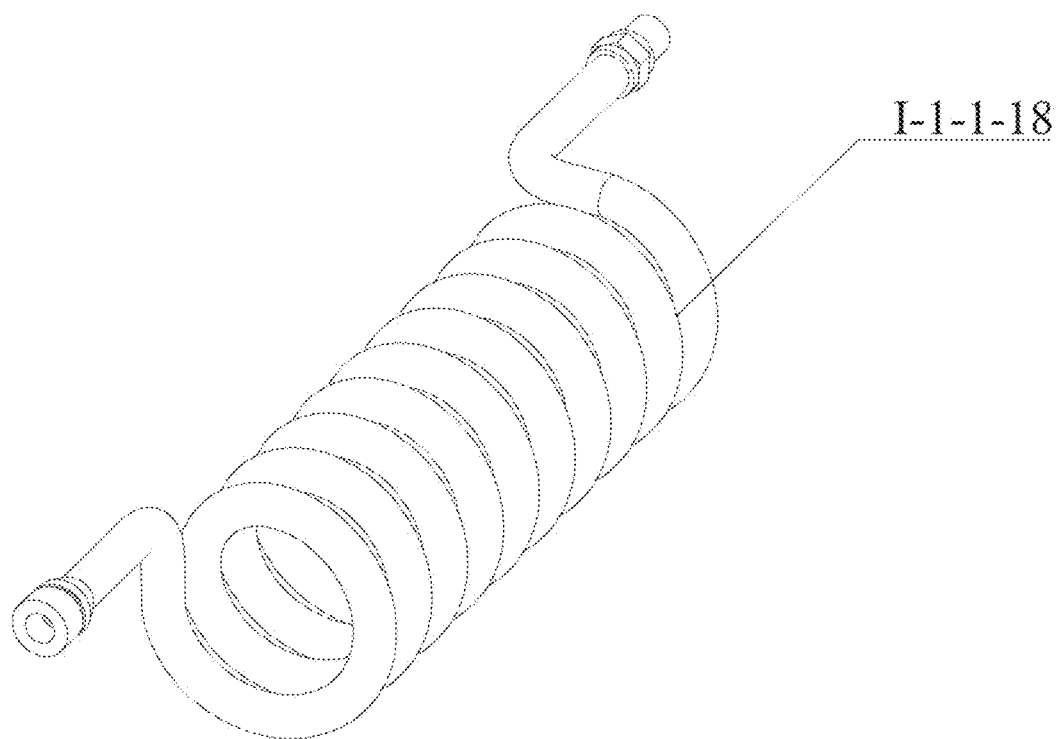
FIG. 8 is an axonometric view of an air tube.

As shown in FIGS. 2 and 3, the bracket assembly I-1 comprises lifting devices I-1-1 and a base I-1-2. Three the lifting devices I-1-1 are mounted on the base along the circumference, and the lifting devices I-1-1 are fixedly connected to the base I-1-2. It should be noted that an installation of the three lifting devices I-1-1 is not arbitrary, and center axes of supporting plates I-1-5-8 on each two the lifting devices I-1-1 are at an included angle of 120 degrees. In this way, the wheel hub III can be placed on the three supporting plates I-1-5-8 and kept in a stable condition. A bottom of the base I-1-2 is welded with a screw, and the bracket assembly I-1 is fixedly connected with the turntable assembly I-2 by threads during the installation. The bracket assembly I-1 can play the role of feeding and blanking and positioning of the wheel hub III.

As shown in FIGS. 4 to 7, the lifting device I-1-1 comprises a sprocket chain I-1-1-1, a barrier plate I-1-1-2, an air source distributor I-1-1-3, a supporting plate assembly I-1-1-4, a first transmission shaft I-1-1-5, a geared motor I-1-1-6, a tensioner I-1-1-7, a mounting seat I-1-1-8, a second transmission shaft I-1-1-9, and a bracket I-1-1-10. Wherein, the bracket I-1-1-10 is used as a supporting part of the whole device, and a bottom of the bracket I-1-1-10 is provided with four ribs to increase the rigidity. The external spherical ball bearings with seats are mounted on top end and bottom end of the bracket I-1-1-10 respectively. The first transmission shaft I-1-1-5 is driven by the geared motor I-1-1-6. The geared motor I-1-1-9 is mounted on the bracket I-1-1-10 by a right angle mounting seat, and a first end of the sprocket chain I-1-1-1 is mounted at a left end of the first transmission shaft I-1-1-5, and a second end of the sprocket chain I-1-1-1 is mounted at a left end of the second transmission shaft I-1-1-9. A transmission ratio of the sprocket chain is 1:1.

The tensioner I-1-1-7 is mounted on the bracket I-1-1-10. The tensioner I-1-1-7 can keep the sprocket chain I-1-1-1 with proper tensioning force during the transmission process, thus preventing the chain from loosening and falling off and reducing the wear of the sprocket chain I-1-1-1.

The barrier plate I-1-1-2 is fixed to the bracket I-1-1-10 by the mounting seat I-1-1-8; a central hole of the barrier plate I-1-1-2 is coaxial with the second transmission shaft I-1-1-9 when the barrier plate I-1-1-2 is mounted, and an axial positioning is realized by a locking retaining ring. It should be noted that a diameter of the central hole of the barrier plate I-1-1-2 is larger than a diameter of the second transmission shaft I-1-1-9, and the barrier plate I-1-1-2 does not rotate with the second transmission shaft I-1-1-9. A function of the barrier plate I-1-1-2 is to prevent the rotation of the sprocket chain I-1-1-1 during feeding and blanking from causing damage to the device by winding the air tube I-1-11 around the second transmission shaft I-1-1-9, and also to mount the air source distributor I-1-1-3. It should be noted that the gas tube I-1-1-11 is a spiral elastic gas tube to prevent the gas tube I-1-1-11 from not being long enough when the supporting plate assembly I-1-1-4 moves with the sprocket chain I-1-1-1.

Figure 9:
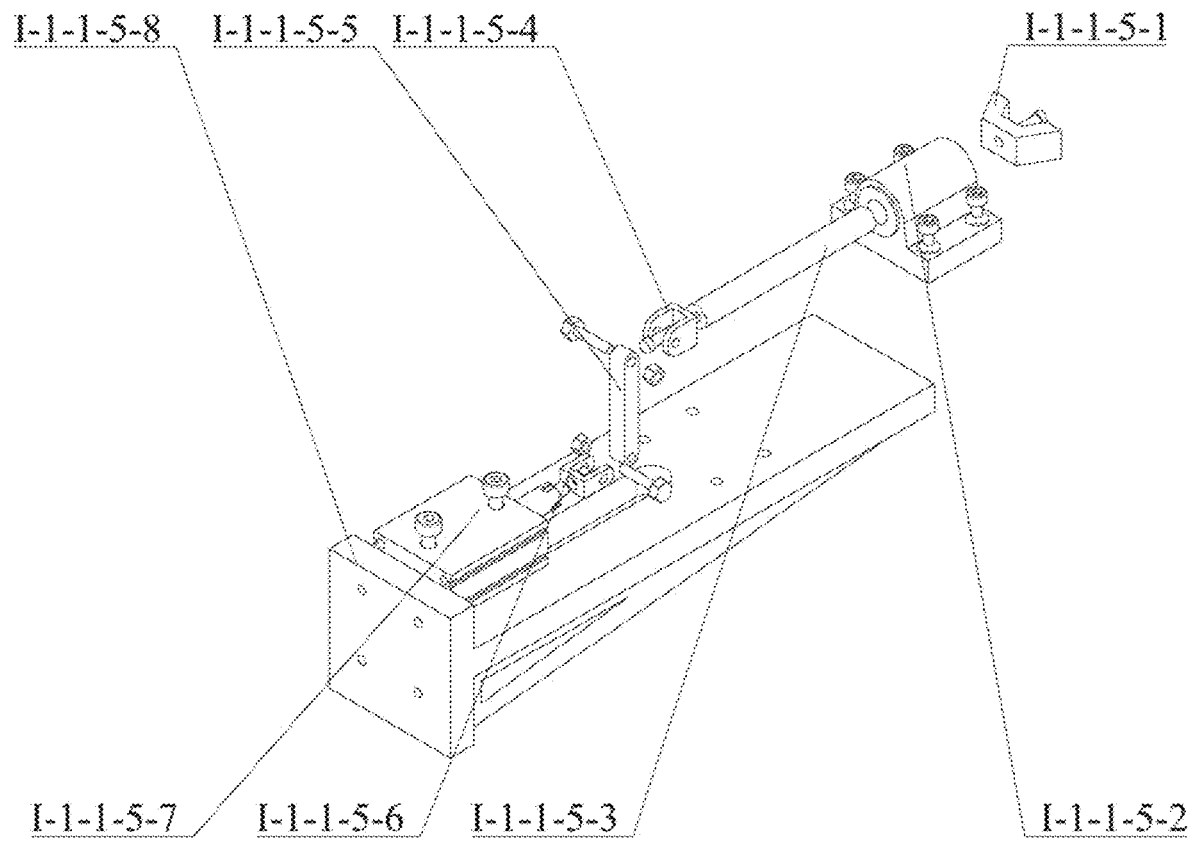
FIG. 9 is an exploded view of a supporting plate assembly.
Figure 10:
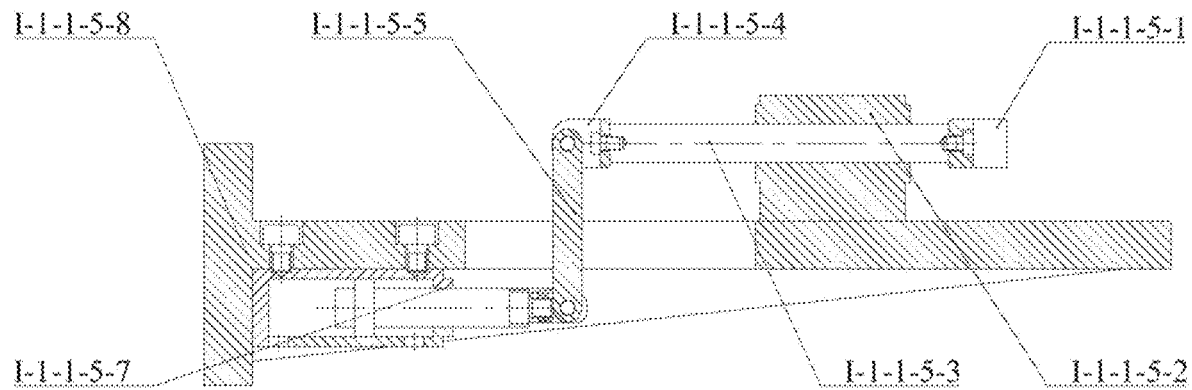
FIG. 10 is a cross-sectional view of a supporting plate.

It should be noted that the chain is a high-strength industrial chain with attachment, and the supporting plate assembly I-1-1-4 is mounted on the chain, and the first transmission shaft I-1-1-5 drives the sprocket chain to rotate, so that the supporting plate assembly I-1-1-4 can move with the chain movement trajectory. As shown in FIGS. 9 and 10, the supporting plate assembly I-1-1-4 comprises a V-shaped block I-1-1-4-1, a straight guide sleeve I-1-1-4-2, a guide rod I-1-1-4-3, a flange I-1-1-4-4, a connecting rod I-1-1-4-5, a flange I-1-1-4-6, an air cylinder I-1-1-4-7, and a supporting plate I-1-1-4-8. The supporting plate I-1-1-4-8 is provided with slots and the bottom thereof is provided with rib plates to ensure the rigidity of the supporting plate I-1-1-4-8. The air cylinder I-1-1-4-7 is mounted in a middle of the two rib plates at the bottom of the supporting plate I-1-1-4-8, and the supporting plate I-1-1-4-8 is fixedly connected to the air cylinder I-1-1-4-7. An extended end of a piston rod of the air cylinder I-1-1-4-7 is provided with threads, and the piston rod of the air cylinder I-1-1-4-7 is fixedly connected with the flange I-1-1-4-6 through the extended end of the piston rod passes through a through-hole on the flange I-1-1-4-6. The connecting rod I-1-1-4-5 passes through the slot on the supporting plate I-1-1-4-8 and is connected to the flange I-1-1-4-6 and flange I-1-1-4-4 respectively. The connecting rod I-1-1-4-5 is fixedly connected to the flange I-1-1-4-4. The guide rod I-1-1-4-3 passes through the straight guide sleeve I-1-1-4-2, and a first end of the guide rod I-1-1-4-3 is fixedly connected to the flange I-1-1-4-4 and a second end of the guide rod I-1-1-4-3 is fixedly connected to the V-shaped block I-1-1-4-1. The straight guide sleeve I-1-1-4-2 with a mounting seat is mounted on the supporting plate I-1-1-4-8.

Specifically, the air cylinder I-1-1-4-7 is mounted below the supporting plate I-1-1-4-8, while the V-shaped block I-1-1-4-1 and the guide I-1-1-4-3 are mounted above the supporting plate I-1-1-4-8, and the piston rod of the air cylinder I-1-1-4-7 is connected to the guide rod I-1-1-4-3 by the connecting rod I-1-1-4-5, the flange I-1-1-4-6, and the flange I-1-1-4-4. In this way, the extension and retraction of the piston rod of the air cylinder I-1-1-4-7 can drive the V-shaped block I-1-1-4-1 forward and backward on the supporting plate I-1-1-4-8. The wheel hub III is placed on a bottom plane consisting of three the supporting plates I-1-1-4-8, which can limit the rotation of the wheel hub III in X-axis, Y-axis directions and the movement in Z-axis direction. Each two the V-shaped blocks I-1-1-4-1 are at an included angle of 120 degrees in the three V-shaped blocks I-1-1-4-1, which play the role of both positioning and clamping, and can limit the movement of the wheel hub III in the X-axis and Y-axis directions when positioning. At this time, only the Z-axis direction of the wheel hub III is not positioned, which is an incomplete positioning method. At the same time, the three V-shaped blocks I-1-1-4-1 are driven by the air cylinders to clamp the wheel hub III. Because the V-shaped blocks I-1-1-4-1 are driven by the air cylinders and has a certain stroke range, the self-positioning and clamping of the wheel hubs III of different sizes can be realized.

Figure 11:
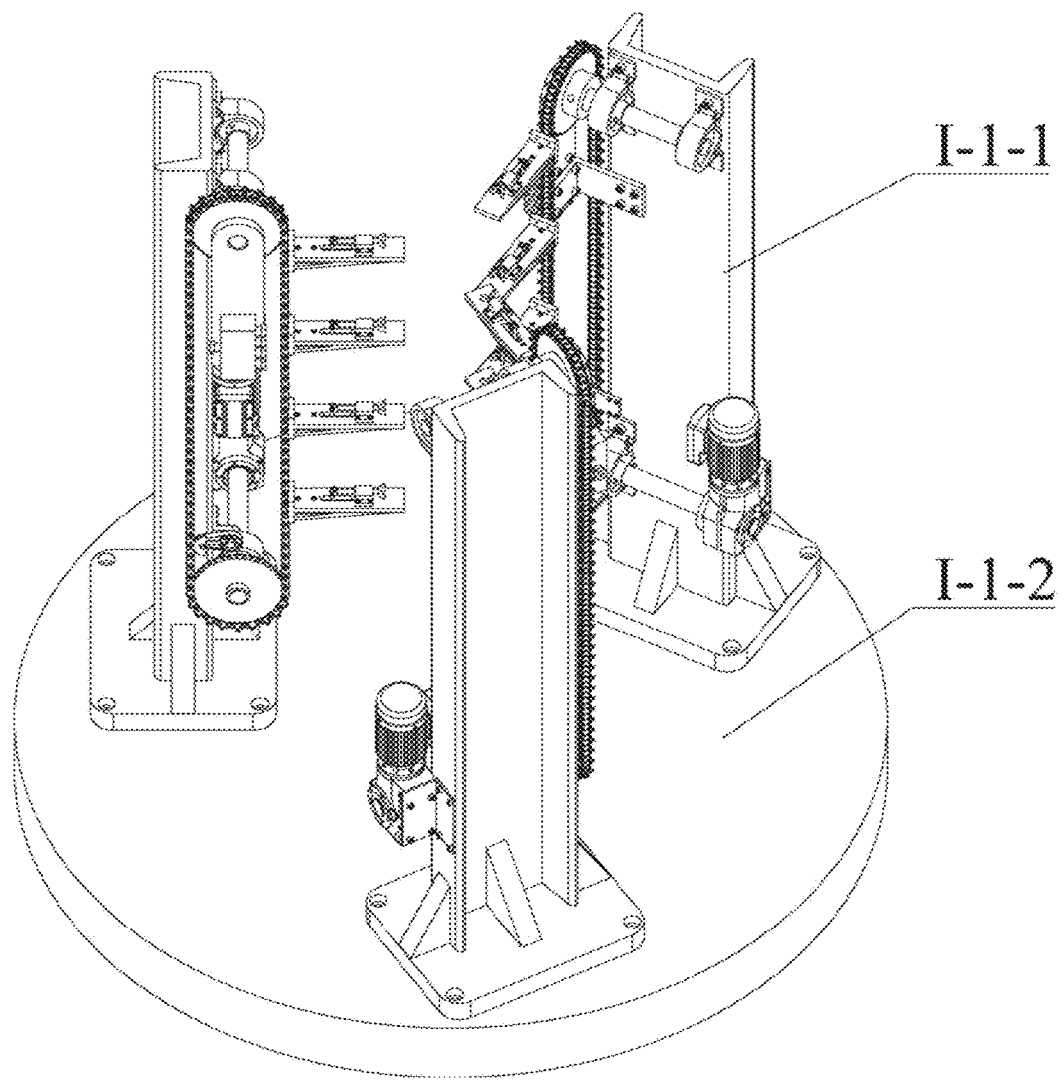
FIG. 11 is an axonometric view of a feeding process of the bracket assembly.
Figure 12:
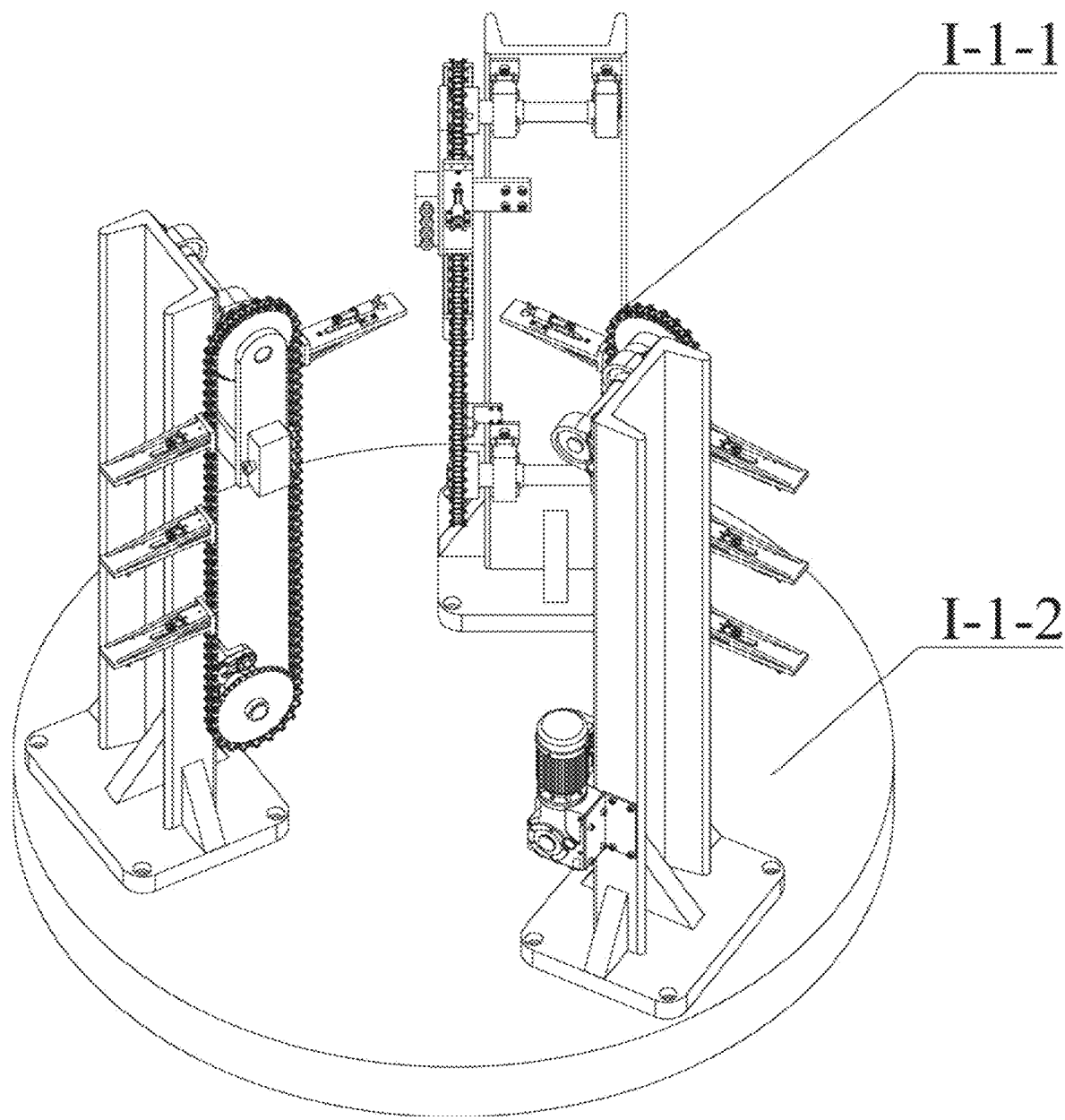
FIG. 12 is an axonometric view of a blanking process of the bracket assembly.

As shown in FIGS. 11 and 12, when the feeding is required, the manipulator II-1 picks up the wheel hub III on an uppermost layer of the bracket assembly I-1, and the helical gear-bevel gear geared motor I-1-1-6 starts to drive the first transmission shaft I-1-1-5 to rotate, and the sprocket chain I-1-1-1 rotates with the first transmission shaft I-1-1-5, and the supporting plate assembly I-1-1-4 on the second layer carries the wheel huh III of the second layer to move upward, and stops when it reaches the position of the original supporting plate assembly I-1-1-4 of the first layer (the uppermost layer) until the bracket assembly I-1-1 is empty-load, i.e. there is no wheel hub III on the bracket assembly I-1-1.

When the blanking is required, the manipulator II-1 places the wheel hub III on the supporting plate assembly I-1-1-4 on the uppermost layer, and the V-shaped block I-1-1-4-1 on the supporting plate assembly I-1-1-4 clamps the wheel hub III in position. It should be noted that, at this time, the supporting plate assembly I-1-1-4 on the uppermost layer is the supporting plate assembly I-1-1-4 on the last layer in the feeding process. When the wheel hub III is loaded on the present layer, the helical gear-bevel gear geared motor I-1-1-6 starts, and a spindle of the helical gear-bevel gear geared motor I-1-1-6 rotates in an opposite direction to that of the feeding, and the supporting plate assembly I-1-1-4 on uppermost layer and the wheel hub III move downward, then the supporting plate assembly I-1-1-4 on a penultimate layer in the feeding process will move to the original position of the supporting plate assembly I-1-1-4 on the uppermost layer and wait for the manipulator II-1 to carry the wheel hub III to the supporting plate assembly I-1-1-4 and clamp it in position until the bracket assembly I-1-1 is full-load, i.e. the bracket assembly I-1-1 is filled with the wheel hub III. In this way, the path of manipulator II-1 and the position of picking and placing part (the wheel hub) are fixed, i.e., the position is always the supporting plate assembly I-1-1-4 on the uppermost layer.

Figure 13:
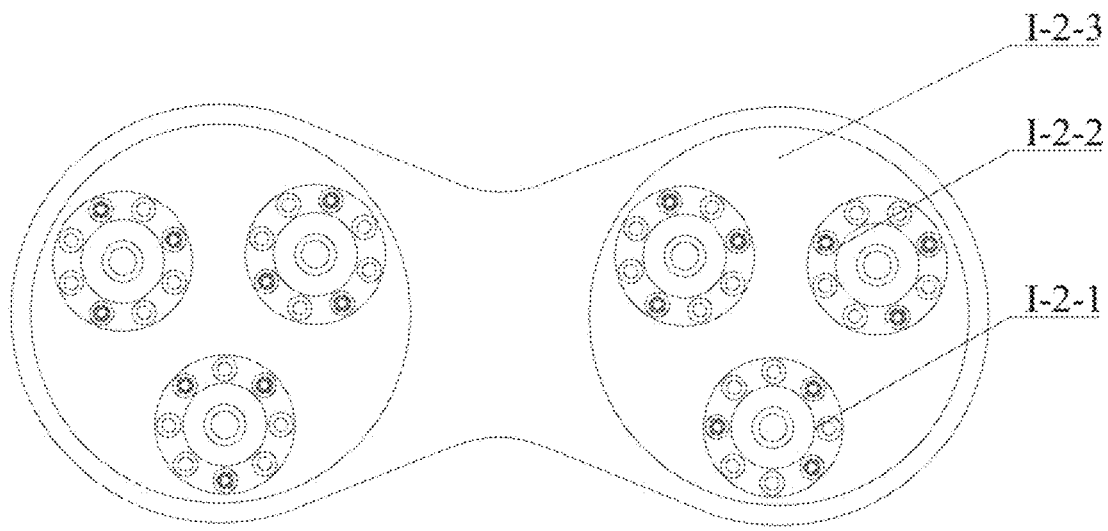
FIG. 13 is an upper view of a turntable assembly.
Figure 14:
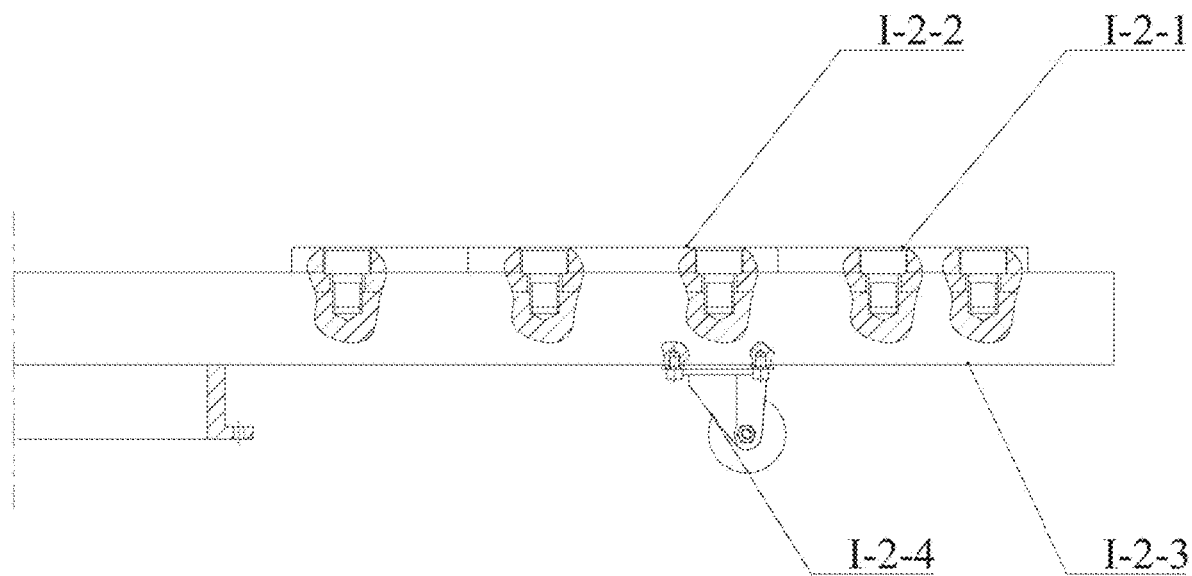
FIG. 14 is a partial cross-sectional view of the turntable assembly.

As shown in FIGS. 13 and 14, the turntable assembly II comprises a spoke weighing sensor I-2-1, a mounting seat I-2-2, a turntable I-2-3, and a universal wheel I-2-4. The turntable I-2-3 is provided with two circular notches, and two the mounting seats I-2-2 and one the spoke weighing sensor I-2-1 are mounted in one circular notch. A structure of the mounting seat I-2-2 is the same as that of the spoke weighing sensor I-2-1, but without sensing function. The mounting seat I-2-2 is round as a whole, countersunk holes are provided along the circumference and a threaded hole is provided in a center thereof. The universal wheel I-2-4 is mounted on a bottom of the turntable I-2-3.

Figure 15:
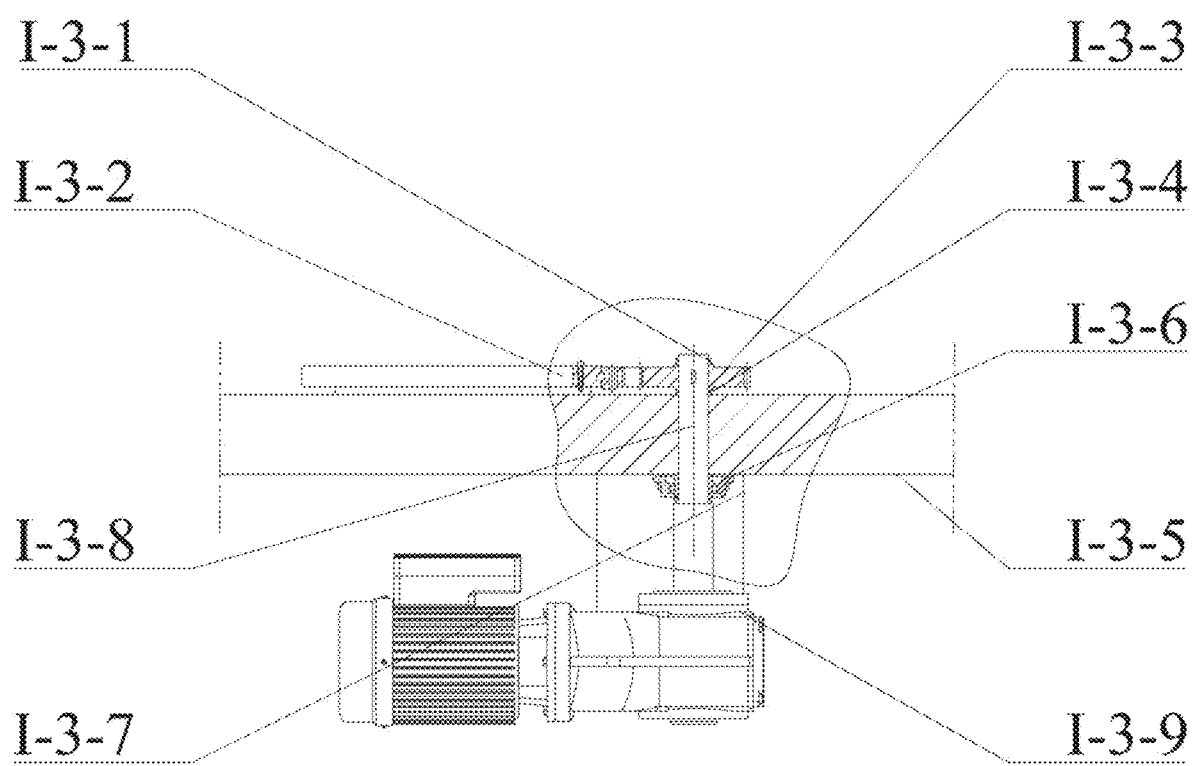
FIG. 15 is a partial cross-sectional view of a bearing seat assembly.

As shown in FIG. 15, the bearing seat assembly III comprises an external gear type slewing bearing I-3-2, a gear I-3-3, a transmission shaft I-3-8, a right angle mounting seat I-3-7, a bearing seat I-3-5, and a geared motor I-3-9. The external gear type slewing bearing I-3-2 is mounted in a center position of the hearing seat I-3-5, and a bearing I-3-6 is mounted under the bearing seat I-3-5, the transmission shaft I-3-8 fits with an inner ring of bearing III-5; the transmission shaft I-3-8 passes through a through-hole on the bearing seat I-3-5 and is mounted in coordination with the gear I-3-3. The gear I-3-3 is axially positioned by a sleeve I-3-4 when matched with the transmission shaft I-3-8, and is axially fixed by a locking retaining ring I-3-1. The gear I-3-3 shall be engaged with the external gear type slewing bearing I-3-2.

Specifically, the geared motor I-3-9 drives the turntable assembly II to rotate, thus causing the two bracket assemblies I-1 mounted on the turntable assembly II to rotate, and the two bracket assemblies I-1 are the full-load bracket assembly I-1 and the empty-load bracket assembly I-1 respectively. During feeding, the full-load bracket assembly I-1 turns next to the robotic arm II-2 and waits for the manipulator II-1 to carry the wheel hub III thereon, while the empty-load bracket assembly I-1 waits for the replenishment of the blank of the wheel hub III. In this way, the continuous feeding process of the wheel hub III can be maintained. During blanking, the empty-load bracket assembly I-1 turns next to the robotic arm and waits for the manipulator II-1 to carry hub III for blanking, while the wheel hub III on the full-load bracket assembly I-1 waits to be carried to the next process.

Figure 16:
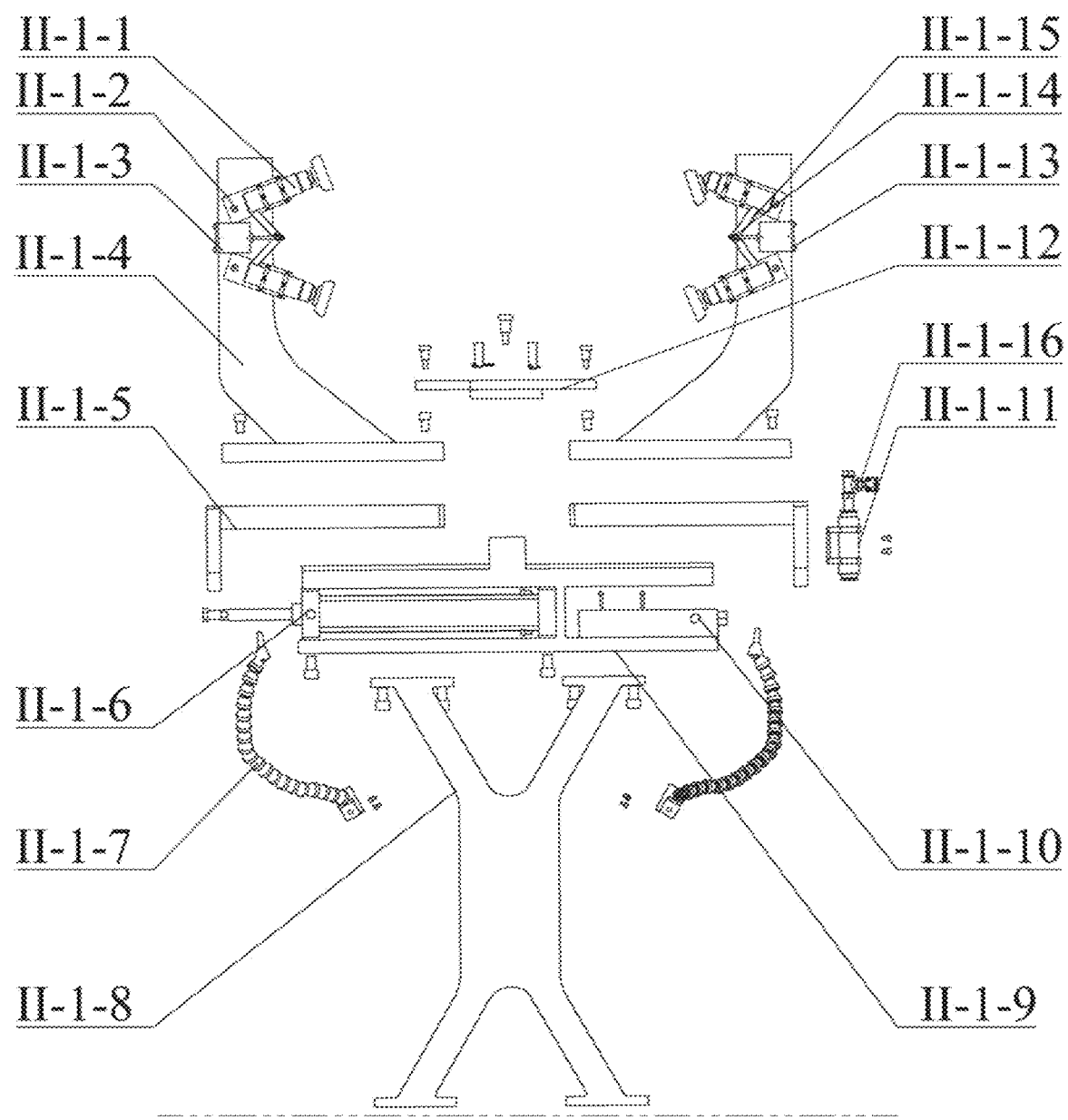
FIG. 16 is an exploded view of a manipulator.
Figure 17:
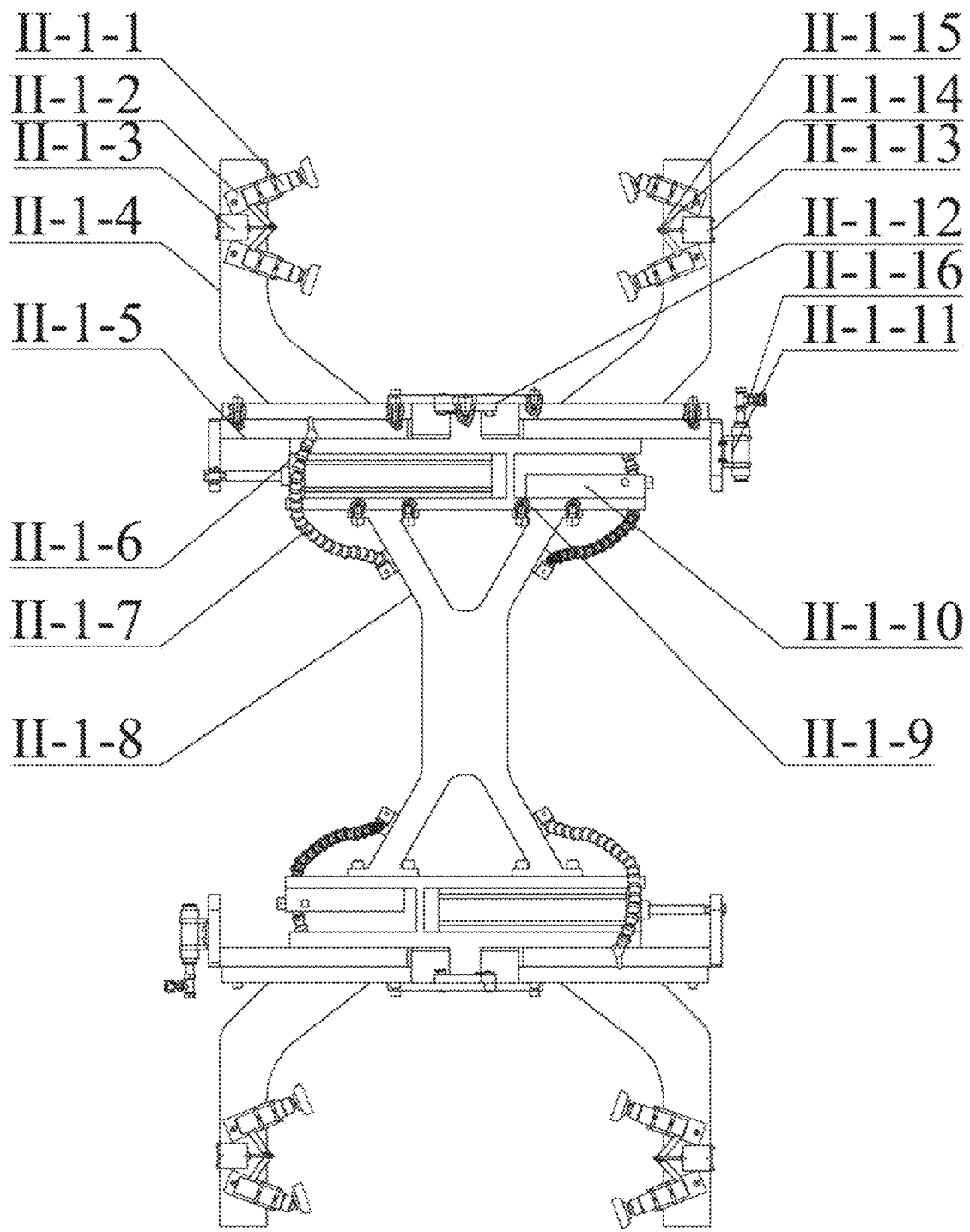
FIG. 17 is a partial sectional view of the manipulator.
Figure 18:
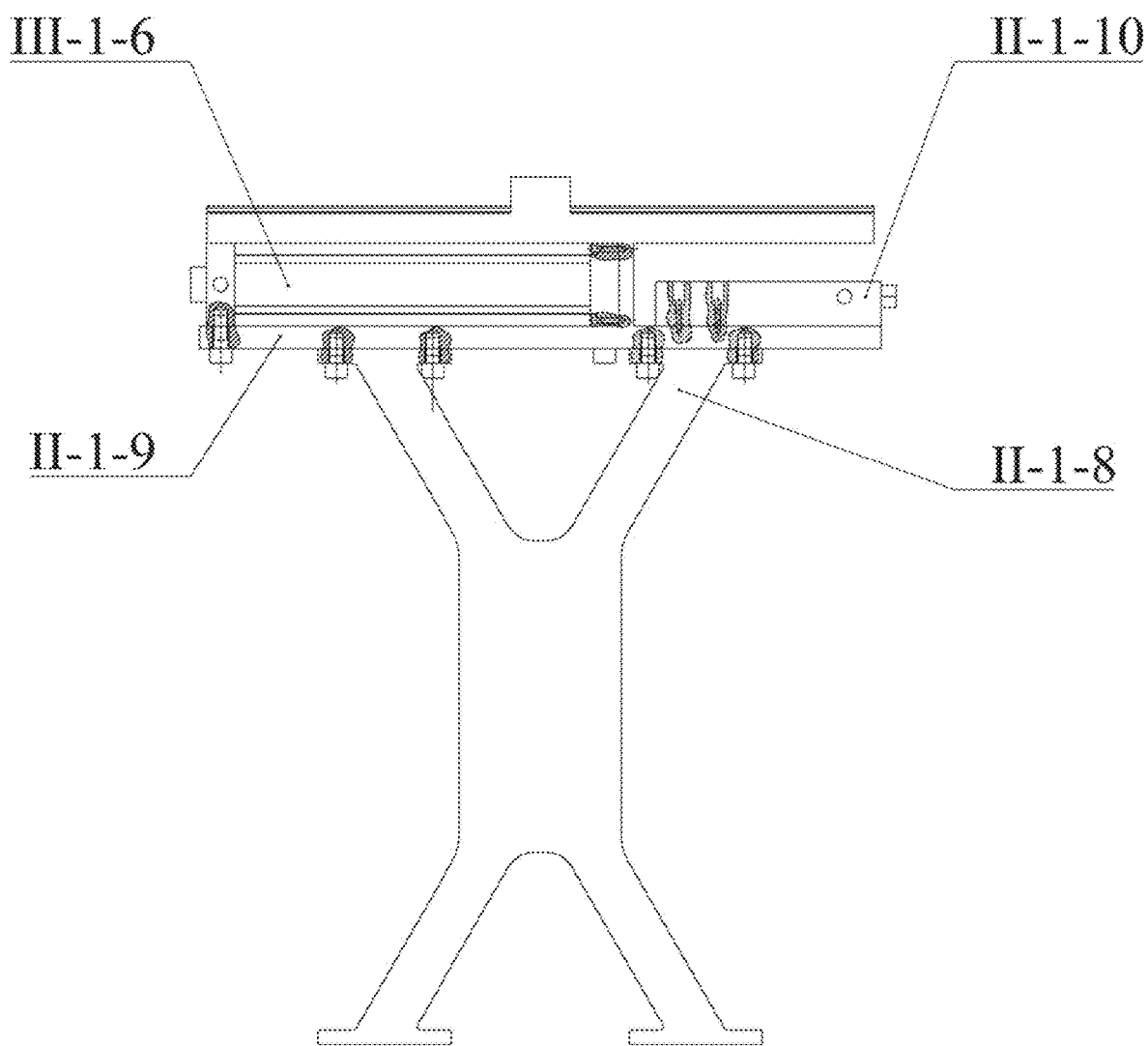
FIG. 18 is a partial sectional view showing the installation of an air cylinder, a mounting seat, a connecting seat and a vacuum generator.
Figure 19:
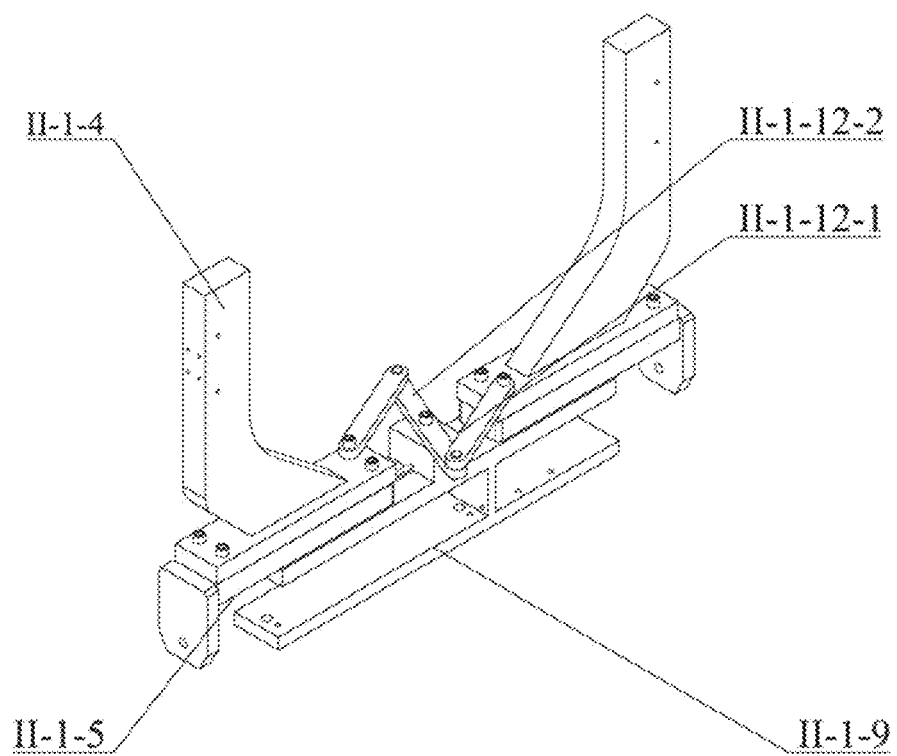
FIG. 19 is an axonometric view of a linkage mechanism.

As shown in FIG. 16, the manipulator II-1 comprises a suction cup assembly II-1-1, a mounting seat II-1-2, a micro air cylinder II-1-3, a damping plate II-1-4, a sliding seat II-1-5, a cylinder II-1-6, an air tube II-1-7, a connecting seat II-1-8, an I-beam mounting seat II-1-9, a vacuum generator II-1-10, a filter II-1-11, a linkage mechanism II-1-12, a flange II-1-14, a connecting rod II-1-15, and a vacuum pressure switch II-1-16.

The air cylinder II-1-6 and the vacuum generator II-1-10 are mounted in the I-beam mounting seat II-1-9, the sliding seat II-1-5 is mounted on a guide rail on the I-beam mounting seat II-1-9, the clamping plate II-1-4 is mounted on the sliding seat II-1-5, and the micro air cylinder II-1-3, the mounting seat II-1-2, the suction cup assembly II-1-1, the flange II-1-14, and the connecting rod II-1-15 are mounted on the clamping plate II-1-4. The micro air cylinder II-1-3, the mounting seat II-1-2, the suction cup assembly II-1-1, the flange II-1-14, and the connecting rod II-1-15 form a crank slider mechanism that can be used to adjust an angle range of two the suction cup assemblies II-1-1 on the same clamping plate II-1-4, so as to adapt the wheel hubs III of different sizes. The two clamping plates II-1-4 are connected by the linkage mechanism II-1-12 to form the crank slider mechanism. The air cylinder II-1-6 pushes one the clamping plate II-1-4 to move, which can drive the other damping plate II-1-4 through the linkage mechanism II-1-12. In this way, the clamping work of the wheel hub III with a large range of size can be achieved by one air cylinder. The sliding seat II-1-5 is provided with the filter II-1-11 and the vacuum pressure switch to monitor the pressure in the gas tube and thus control the opening and closing of the gas tube. A side surface of the connecting seat II-1-8 is mounted with the gas tube II-1-7 for removing residual aluminum chips from the wheel hub III after machining. The I-beam mounting seat II-1-9 is mounted on a first end of the connecting seat II-1-8, and a second end of the connecting seat II-1-8 is mounted with the same device as described above.

Specifically, when the manipulator II-1 clamps the wheel hub 111, the clamping plate II-1-4 is in a maximum stroke position driven by the air cylinder II-1-6, and the manipulator II-1 reaches a designated position according to the set stroke trajectory. The computer controls the pneumatic circuit and then adjusts the opening and closing angle of the suction cup assembly II-1-1 on the clamping plate II-1-4 to fit the corresponding wheel hub III size according to the size of the wheel hub III. The computer controls the pneumatic circuit and then controls the piston rod of cylinder II-1-6 to retract, thus driving the two clamping plates II-1-4 to move to center, while the vacuum circuit starts to work, when the thrust of the clamping plates II-1-4 makes the suction cup II-1-1-1 completely fit on the wheel rim surface of the wheel hub III, the vacuum circuit makes a negative pressure inside the suction cup II-1-1-1, when the negative pressure reaches a certain value, the vacuum pressure switch II-1-16 sends an electric signal, the piston rod of the air cylinder II-1-6 stops retracting, the vacuum circuit closes, the manipulator II-1 completes the clamping work, and the robotic arm II-2 drives to carry the wheel hub III to the designated position. The vacuum pressure switch II-1-16 monitors the vacuum pressure of the vacuum circuit in real time. When the negative pressure is less than the predetermined value, the vacuum circuit is opened to ensure that the negative pressure is maintained at the predetermined value.

As shown in FIGS. 17 to 21, the I-beam mounting seat II-1-9 is fixedly connected to the connecting seat II-1-8, the air cylinder II-1-6 and the vacuum generator II-1-10 are mounted in a through slot of the I-beam mounting seat II-1-9, the I-beam mounting seat II-1-9 is provided with a guide rail, the sliding seat II-1-5 is mounted on the guide rail of the I-beam mounting seat II-1-9, an extended end of piston rod of the air cylinder II-1-6 is connected with sliding seat II-1-5, and the sliding seat can slide along the guide rail on the I-beam mounting seat II-1-9 by the pushing of the piston rod of the air cylinder II-1-6.

The clamping plate II-1-4 is fixedly connected to the sliding seat II-1-5, so that the clamping plate II-1-4 can slide linearly with the sliding seat II-1-5 on the I-beam mounting seat II-1-9 along the guide rail. A center rod IV-12-2 of the linkage mechanism II-1-12 is mounted at a center position of the I-beam mounting seat II-1-9. The center IV-12-2 is rotatable around the center axis. First ends of two connecting rods IV-12-1 are connected to the center rod IV-12-2, and second ends thereof are connected to the mounting seat. The linkage mechanism II-1-12 and the clamping plate II-1-4 form the crank slider mechanism, and the sliding seat II-1-5 moves linearly along the guide rail on the I-beam mounting seat II-1-9 through the pushing of the piston rod of the cylinder II-1-6, thus making the clamping plate II-1-4 at one end to do the linear movement, and through the action of the crank slider mechanism, the clamping plate II-1-4 at the one end doing the linear movement can drive the clamping plate II-1-4 at the other end to move back or opposite at the same time. The filter II-1-11 is mounted on the mounting bracket, and the filter II-1-11 is mounted on a side surface of the sliding seat II-1-5 through the mounting bracket. An outlet end of the filter II-1-11 is connected with a tee connector, and the vacuum pressure switch II-1-16 is mounted on one joint of the tee connector to monitor the vacuum pressure in the vacuum circuit and control the switching of the air circuit. The air tube II-1-7 is mounted on a side surface of the connecting seat II-1-8. The air tube can be used to remove the aluminum chips left in the wheel hub III after machining. The flange is welded to the connecting seat II-1-8 for connection to the robotic arm II-2.

Figure 21:
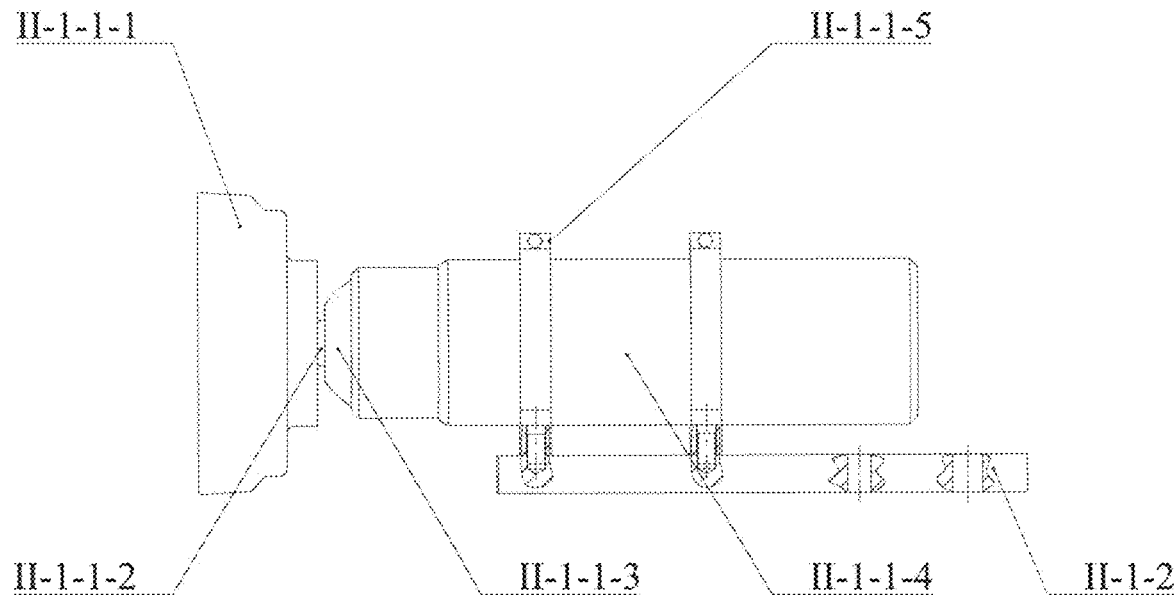
FIG. 21 is a partial sectional view showing the installation of a suction cup assembly.

As shown in FIG. 21, in the present embodiment, the clamping plate II-1-4 is provided with the suction cup assembly II-1-1, the mounting seat II-1-2, the micro air cylinder II-1-3, the connecting rod II-1-15, the flange II-1-14, and the cylinder mounting seat II-1-13.

Figure 20:
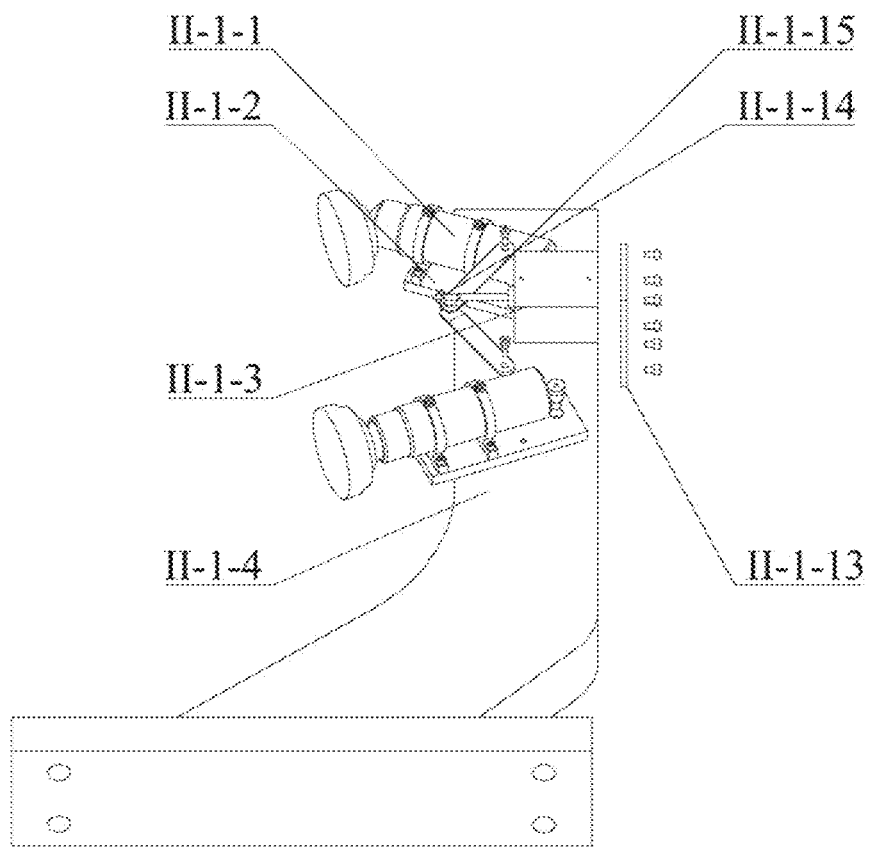
FIG. 20 is an exploded view of parts on the clamping plate.

The mounting seat II-1-2 is hinged with a T-shaped pin shaft with threaded on the clamping plate II-1-4 and can be rotated around the T-shaped pin shaft with threaded on the clamping plate. A fastening ring II-1-1-5 in the suction cup assembly II-1-1 is fixedly connected to the mounting seat II-1-2. First ends of the two connecting rods II-1-15 are hinged with the two mounting seats II-1-2 respectively, and second ends thereof are hinged by the flange II-1-14. The micro air cylinder II-1-3 is mounted in the middle of the two mounting seats II-1-2 and fixed to the clamping plate II-1-4 by the air cylinder mounting seat II-1-13, and an extended end of the piston rod of the micro air cylinder II-1-3 is fixedly connected to the flange II-1-14. In this way, the included angle of the two mounting seats II-1-2 and thus the included angle of the two suction cup assemblies II-1-1 can be controlled by the extension and contraction of the piston rod of the micro air cylinder II-1-3, so as to adapt to the clamping work of the wheel hub III of different sizes. A linkage mechanism composed of the mounting seat II-1-2, the micro air cylinder II-1-3, the connecting rod II-1-15, the flange II-1-14 can be simplified as shown in FIG. 20, there are a total number of members n=5, 1 sliding pair, 6 revolutes, so a total of low pair $P_1$=7, so the degree of freedom of the mechanism is: $3n-2P_1=1$.

The suction cup assembly II-1-1 comprises a suction cup II-1-1-1, a connector II-1-1-2, a ball head II-1-1-3, ball tiles II-11-4, and the tightening ting II-1-1-5. The connector II-1-1-2 is mounted on the ball head II-1-1-3, and the suction cup II-1-1-1 and the connector II-1-1-2 are bonded by sealant. The ball head II-1-1-3 is mounted in a ball groove of the two ball tiles II-11-4, and the two ball tiles II-11-4 are kept mutually bonded by the tightening ring II-1-1-5 to ensure that the ball head II-1-1-3 does not fall off in the ball tiles II-11-4. A clamping force of the two ball tiles II-11-4 on the ball head can be adjusted by adjusting a screw on the tightening ring II-1-1-5. The tightening ring II-1-1-5 is mounted on the mounting seat II-1-2 by bolt. It should be noted that through slots are provided inside the ball head II-1-1-3 and ball tiles II-11-4 as a passageway of the air circuit. The suction cup II-1-1-1 can be fully fitted with the wheel hubs III of different sizes by the ball head II-1-1-3. At the same time, the suction cup IV-1-3 can play a certain cushioning role, and the material of the suction cup IV-1-3 will not damage the processed wheel hub III.

It should be noted that there is a polish rod welded in the ball groove of the ball tile II-11-4, and the polish rod is interference fit with a through-hole on the ball head, so that the ball head II-1-1-3 can be rotated only in the left and right directions, which can prevent the ball head II-1-1-3 from turning downward due to the gravity of the wheel hub III when the wheel hub III is clamped up.

Figure 22:
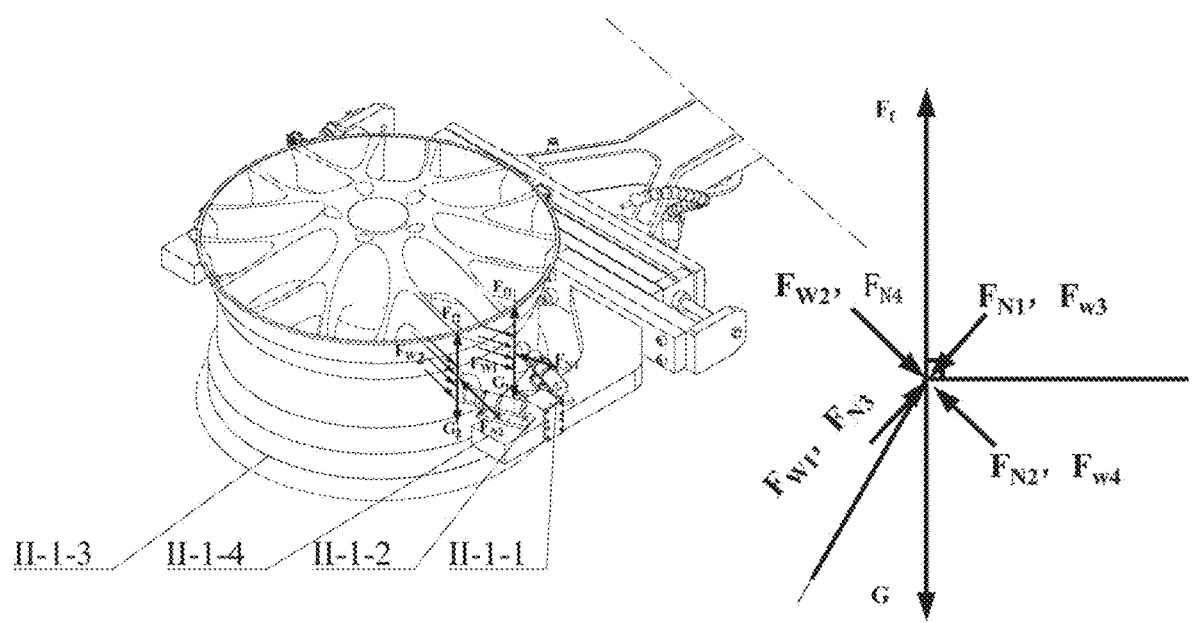
FIG. 22 is a sketch of forces on the wheel hub when being clamped.

As shown in FIG. 22, when the wheel hub III is in the clamping state, an adsorption force $F_{wn}$ (n=1, 2, 3, 4) of the suction cup II-1-1-1 to the wheel hub III, a support force F (n=1, 2, 3, 4) of the suction cup II-1-1 to the wheel hub III, the gravity $G_n$ (n=1, 2, 3, 4) and a friction force $F_{fn}$ (n=1, 2, 3, 4) of the suction cup II-1-1-1 to the wheel hub III, and when the manipulator II-1 clamps the wheel hub III, it only needs to ensure that the wheel hub III does not fall, so there only needs a maximum static friction $F_{fmax}$ ($F_{fmax}$+$F_{f1}$+$F_{f2}$+

$F_{f3}+F_{f4}$) of the four suction cups II-1-1-1 to the wheel hub III is greater than or equal to the gravity CIF of the wheel hub III, that is, $F_{fmax} \geq G$. According to a calculation formula for suction cup selection, when lifting vertically, the maximum static friction force $F_{fmax}$ (n=1, 2, 3, 4) is a theoretical lifting force F, i.e. $F_{fmax}=F=f\times0.1\times A\times P$, wherein F is the theoretical lifting force (N), f is a safety factor (when hanging vertically: more than ⅛), A is an adsorption area of the suction cup (cm²), P is the vacuum pressure (kPa). If it is known that the theoretical lifting force F is equal to the gravity G of the wheel hub III and the vacuum pressure P generated by the vacuum generator, a cup diameter of the vacuum suction cup can be calculated according to the formula for calculating the cup diameter of vacuum suction cup, and the formula for calculating the cup diameter of the vacuum suction cup is:

$$D = \sqrt{\frac{4}{3.14} \times \frac{1}{P} \times \frac{W}{n} \times \frac{1}{f} \times 1000},$$

wherein D is diameter of suction cup (mm), n is number of suction cups relative to the workpiece (n=4), F is the theoretical lifting force (N), P is the vacuum degree (kPa), and f is the safety factor.

$$D = \sqrt{\frac{4}{3.14} \times \frac{1}{P} \times \frac{W}{n} \times \frac{1}{f} \times 1000}$$

If the diameter of suction cup D and the vacuum degree P of the vacuum generator are known, it is enough to verify that the theoretical lifting force $F=f\times0.1\times A\times P \geq G$.

Figure 23:
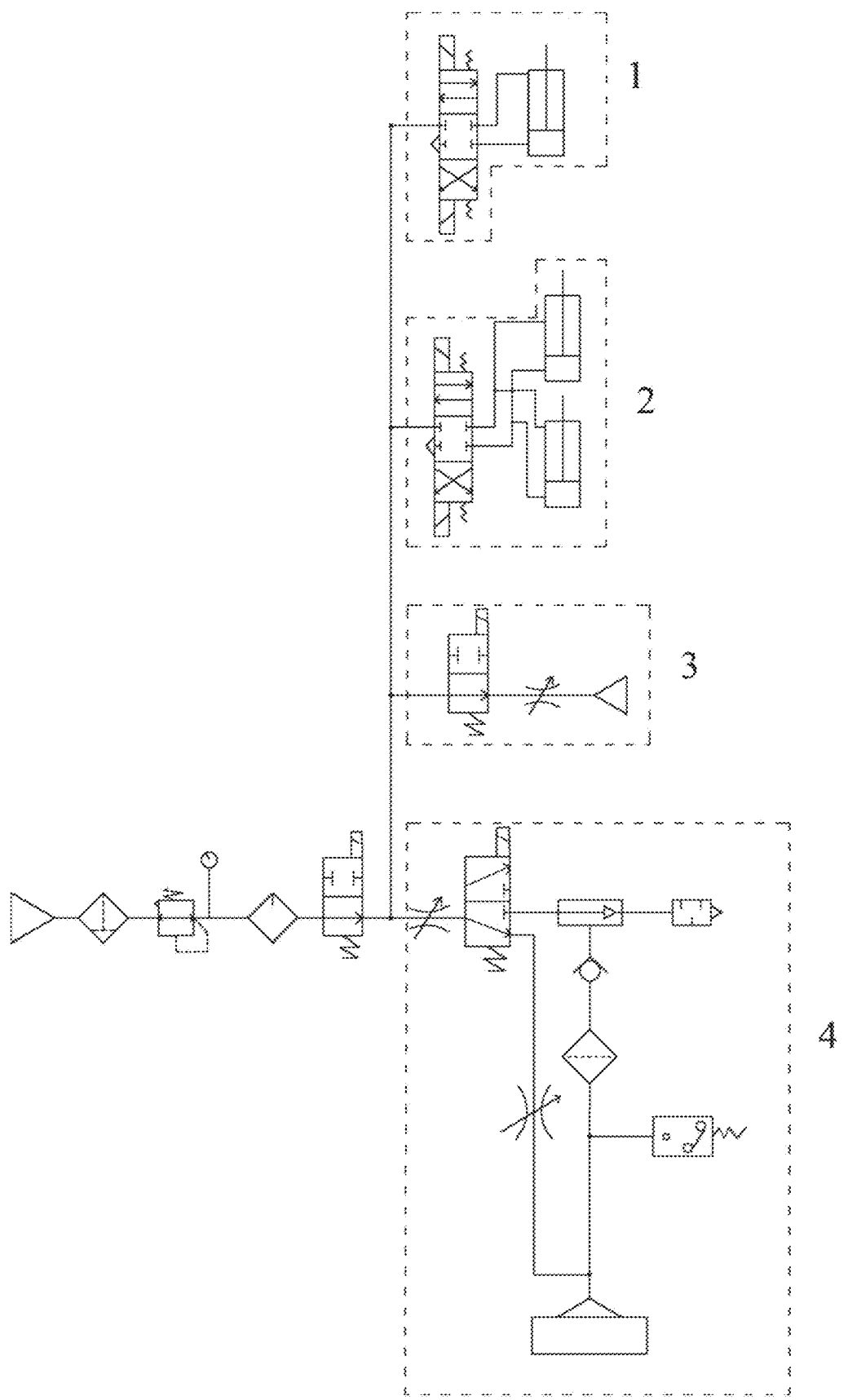
FIG. 23 is a diagram of a pneumatic circuit of the manipulator.

As shown in FIG. 23 is the pneumatic circuit of the manipulator IV. A pressure gas source passes through a gas source triplex and two-position two-way solenoid valve to an air cylinder circuit 1, a micro air cylinder circuit 2, a nozzle circuit 3 and a suction cup circuit 4 respectively, wherein, in cylinder circuit 1, a compressed gas after pressure regulation and filtration reaches the air cylinder II-1-6 through a three-position four-way solenoid valve, the air cylinder II-1-6 can control the movement of the clamping plate II-1-4. In the micro air cylinder circuit 2, the compressed gas after pressure regulation and filtration goes to the two micro air cylinders II-1-3 on the two clamping plates through the three-way four-way valve. The micro air cylinder II-1-3 adjusts the opening and closing angles of the two suction cup assemblies II-1-1 on the same clamping plate to adapt to the clamping of the wheel hub III of different sizes. In the nozzle circuit 3, the compressed gas after pressure regulation and filtration reaches a nozzle of the gas tube II-1-7 through the two-position two-way solenoid valve and throttle valve. The two-position two-way solenoid valve controls the opening and closing of the nozzle of the gas tube II-1-7, and the throttle valve controls a flow rate of the gas ejected from the nozzle of the gas tube II-1-7. The compressed gas ejected from the nozzle of the gas tube II-1-7 can remove the aluminum chips and surface dust left by the machining of the wheel hub III. In the suction cup circuit 4, the compressed gas after pressure regulation and filtration goes to the vacuum circuit and a broken vacuum circuit respectively through the throttle valve and a two-position three-way solenoid valve, the vacuum circuit is that the compressed gas passes through the vacuum generator II-1-10, a check valve, the filter II-1-11, the vacuum pressure switch II-1-16, and the suction cup II-1-1-1 in turn. A function of the vacuum pressure switch II-1-16 is to monitor the vacuum pressure in the vacuum circuit and control the opening and closing of the vacuum circuit. The broken vacuum circuit is that the compressed gas passes through a speed control valve and reaches the suction cup II-1-1-1 directly. A function of the speed control valve is to control the flow rate of the compressed gas. A function of the two-position three-way solenoid valve is to adjust the flow direction of the compressed gas and control the compressed gas through the vacuum circuit or the broken vacuum circuit.

Figure 24:
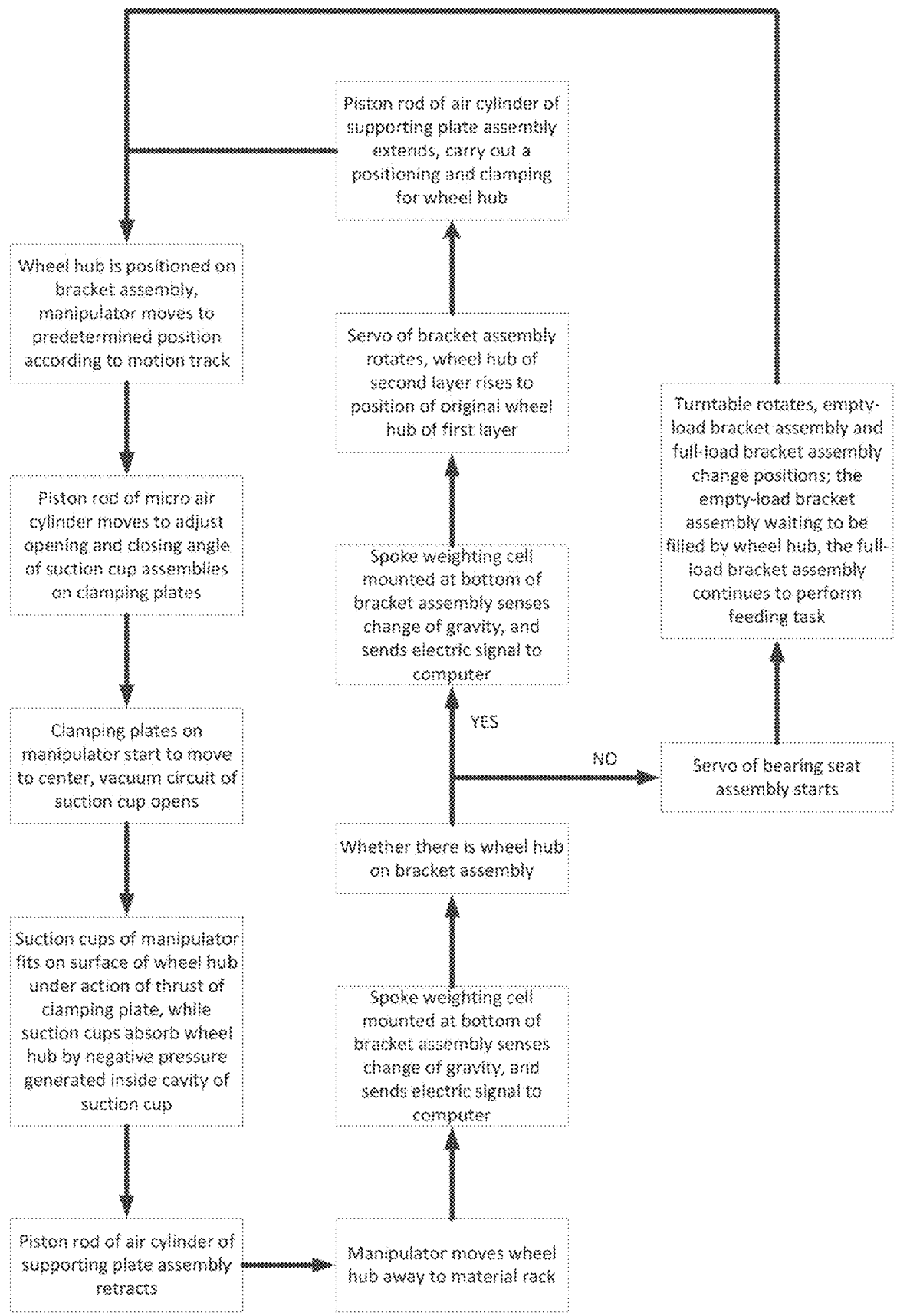
FIG. 24 is a flow chart of feeding of the wheel hub feeding-blanking system.
Figure 25:
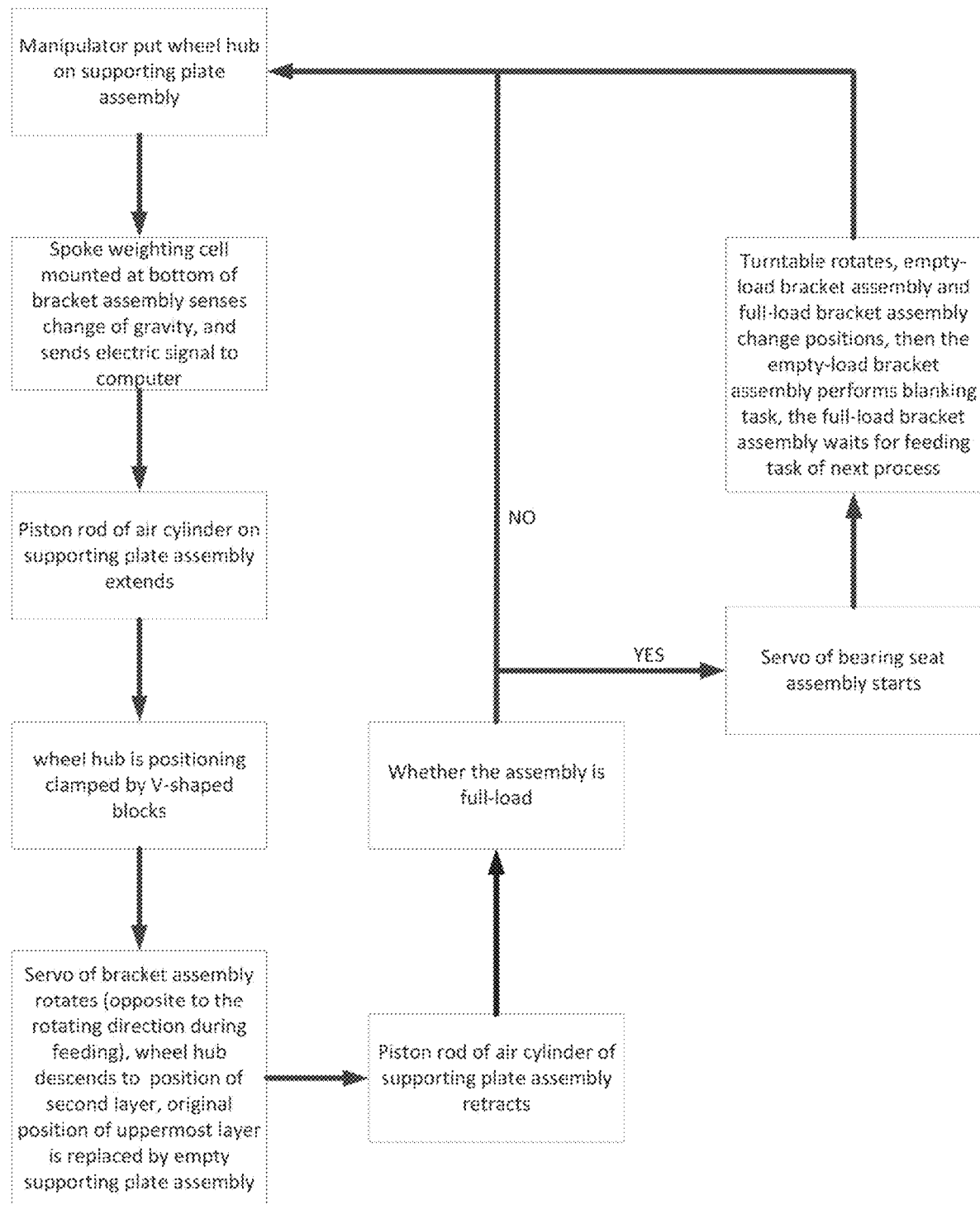
FIG. 25 is a flow chart of blanking of the wheel hub feeding-blanking system.

As shown in FIGS. 24 and 25 is a specific workflow of the feeding-blanking system. During feeding, a state of the bracket assembly I-1 is shown in FIG. 13, the wheel hub III is in place on the bracket assembly I-1, the robot II reaches the predetermined position according to the motion track, the computer controls the piston rod of the micro air cylinder II-1-3 on the clamping plate II-1-4 to move according to the size of wheel hub III, to adjust the opening and closing angle of the suction cup assembly II-1-1 on the clamping plate II-1-4, the computer controls the piston rod of the air cylinder II-1-6 of manipulator II-1 retracts, so that the clamping plates II-1-4 move to center, and at the same time, the vacuum circuit of the suction cup II-1-1 is opened, and the suction cup II-1-1-1 of the manipulator II-1 fits on the surface of the wheel hub III under the thrust of the clamping plate II-1-4, and at the same time, the negative pressure is generated in the cavity of the suction cup II-1-1, so that the wheel hub III is completely absorbed by the suction cup II-1-1. At this point, the wheel hub III is completely clamped by the manipulator II-1. The vacuum pressure switch II-1-16 opens or closes according to the negative pressure value in the vacuum circuit and sends a signal to the computer. The computer sends a signal to the bracket assembly I-1, and the piston rod of the air cylinder I-1-1-4-7 in the supporting plate assembly I-1-1-4 retracts, making the V-shaped blocks I-1-1-4-1 to release the wheel hub III. The computer sends a signal to the robot II to move the wheel hub III to the designated position. The spoke weighing sensor I-2-1 at the bottom of the bracket assembly I-1 senses the change of gravity and sends an electric signal to the computer, the computer judges whether there is any the wheel hub III left on the bracket assembly I-1 based on the electric signal, and if there is any the wheel hub III left, the helical gear-bevel gear geared motor I-1-1-6 of the lifting device I-1-1 starts, and the wheel hub III of the second layer rises to the uppermost position and continues to execute the feeding process as described above. If there is no the wheel hub III remaining on the bracket assembly I-1, the helical gear-bevel gear geared motor I-3-9 in the bearing seat assembly III starts, the turntable I-2-3 rotates 180 degrees, and the full-load bracket assembly I-1 and the empty-load bracket assembly I-1 switch, and the full-load bracket assembly continues to perform the feeding task, and the empty-load bracket assembly I-1 waits for the replenishment of the wheel hub III.

During blanking, the state of the bracket assembly I-1 at this time is shown in FIG. 14. The manipulator II-1 places the wheel hub III on the supporting plate assembly I-1-1-4 of the uppermost layer, and the spoke weighing sensor I-2-1 mounted at the bottom of the bracket assembly I-1 senses the change of gravity and sends the electric signal to the computer, and the piston rod of the air cylinder I-1-1-4-7 of the supporting plate assembly I-1-1-4 extends, and the V-shaped blocks I-1-1-4-1 position and clamp the wheel hub III. The computer judges whether the bracket assembly I-1 is full-load or not based on the electric signal sent by the spoke weighing sensor I-2-1. If not full, when the wheel hub III is positioned and clamped, the helical gear-bevel gear geared motor I-1-1-6 of the lifting device I-1-1 rotates, the wheel hub III descends to the position of the second layer, and the position of the original supporting plate assembly I-1-1-4 of the uppermost layer is replaced by the empty supporting plate assembly and the piston rod of the air cylinder I-1-1-47 of the supporting plate assembly I-1-1-4 retracts, and the manipulator II-1 and the bracket assembly I-1-1 begin to perform a new round of the above actions. If the bracket assembly I-1 is full, the helical gear-bevel gear geared motor I-3-9 of the bearing seat assembly III starts, the turntable I-2-3 rotates 180 degrees, the empty-load bracket assembly I-1 and the full-load bracket assembly change positions, the empty bracket assembly continues to perform the blanking task, and the wheel hub III on the full-load bracket assembly I-1 waits for the feeding task of the next process or being put into the storage.

What is claimed is:

1. A full-automatic wheel hub feeding-blanking system for intelligent production line of automotive wheel hubs, comprising: an intelligent material rack and a robot;
    the intelligent material rack comprises a bracket assembly, a turntable assembly and a bearing seat assembly; the turntable assembly is mounted on the bearing seat assembly, and the turntable assembly is rotatable; the bracket assembly is mounted on the turntable assembly, comprising a base; at least one set of lifting devices is provided on the base, and each set of the lifting devices comprises three of the lifting devices; each of the lifting devices is provided with an automotive wheel hub supporting plate assembly, and an included angle between central axes of each two of the three automotive wheel hub supporting plate assemblies on the three lifting devices is 120 degrees;
    the robot, being mounted on one side of the intelligent material rack, comprising a robotic arm, and a manipulator mounted on the robotic arm being used for clamping the automotive wheel hub.

2. The full-automatic wheel hub feeding-blanking system as claimed in claim 1, wherein,
    each of the lifting devices comprises a respective bracket, each of the respective bracket is mounted on the base, a sprocket chain lifting mechanism is mounted on each of the respective bracket, and a plurality of bearing seat assemblies of the bearing seat assembly are sequentially arranged on the sprocket chain lifting mechanism.

3. The full-automatic wheel hub feeding-blanking system as claimed in claim 2, wherein each of the automotive wheel hub supporting plate assemblies comprises a respective supporting plate, a respective air cylinder, a respective sliding sleeve, and a respective V-shaped block; each of the respective air cylinder is fixed on each of the respective supporting plate and is connected with a first end of a first connecting rod which is vertically arranged, and a second end of the first connecting rod is connected with a second connecting rod which is horizontally arranged, and the second connecting rod is connected to each of the respective V-shaped block through each of the respective sliding sleeve fixed on each of the respective supporting plate.

4. The full-automatic wheel hub feeding-blanking system as claimed in claim 3, wherein a barrier plate is also mounted on each of the respective bracket, each of the respective air cylinder is supplied with air by an air source distributor mounted on the barrier plate.

5. The full-automatic wheel hub feeding-blanking system as claimed in claim 1, wherein,
    the manipulator comprises a connecting seat, and a clamping device is respectively arranged at two ends of the connecting seat, and structures of the two clamping devices each comprising: a mounting seat, and two clamping plates being symmetrically arranged on the mounting seat and driven by a control of a computer; two suction cup assemblies are arranged on each of the clamping plates, an angle between the two suction cup assemblies is changed by driving of a micro air cylinder.

6. The full-automatic wheel hub feeding-blanking system as claimed in claim 5, wherein,
    each of the suction cup assemblies comprises a respective suction cup, a respective connector, a respective ball head, respective two ball tiles and a respective tightening ring, wherein each of the respective ball head is mounted in a ball groove formed by each of the respective two ball tiles, and each of the respective two ball tiles are locked by each of the respective tightening ring, each of the respective connector is connected to each of the respective ball head by threads, and each of the respective suction cup is connected to each of the respective connector.

7. The full-automatic wheel hub feeding-blanking system as claimed in claim 1, wherein,
    the turntable assembly comprises a spoke weighing sensor, a mounting seat, a turntable and a universal wheel; two circular slots are processed on the turntable for mounting the spoke weighing sensor and the mounting seat; the bracket assembly is connected with the mounting seat and the spoke weighing sensor; the universal wheel is set at a bottom of the turntable.

8. The full-automatic wheel hub feeding-blanking system as claimed in claim 7, wherein,
    a shape of the turntable a loop shape with the two circular slots are machined thereon, and two mounting seats of the mounting seat and one of the spoke weighing sensor are mounted in one of the circular slots.

9. The full-automatic wheel hub feeding-blanking system as claimed in claim 7, wherein,
    the turntable is driven by a motor on the bearing seat assembly.

10. The full-automatic wheel hub feeding-blanking system as claimed in claim 7, wherein,
    the mounting seat has the same shape and size as the spoke weighing sensor.

* * * * *